(12) United States Patent
Kile

(10) Patent No.: US 9,504,204 B2
(45) Date of Patent: Nov. 29, 2016

(54) REMOVABLE CONCAVE THRESHING BARS FOR AN AGRICULTURAL COMBINE

(71) Applicant: Kevin J. Kile, Spokane, WA (US)

(72) Inventor: Kevin J. Kile, Spokane, WA (US)

( * ) Notice: Subject to any disclaimer, the term of this patent is extended or adjusted under 35 U.S.C. 154(b) by 150 days.

(21) Appl. No.: 14/197,595

(22) Filed: Mar. 5, 2014

(65) Prior Publication Data
US 2015/0250101 A1 Sep. 10, 2015

(51) Int. Cl.
A01F 12/24 (2006.01)
A01F 12/26 (2006.01)

(52) U.S. Cl.
CPC ..................... A01F 12/26 (2013.01)

(58) Field of Classification Search
CPC .. A01F 12/24; A01F 12/26; B02C 2023/165
USPC ............. 460/108, 107, 110, 46, 59; D15/18; 241/88.4, 89.2, 89.4
See application file for complete search history.

(56) References Cited

U.S. PATENT DOCUMENTS

| 2,159,664 | A | * | 5/1939 | Lindgren | A01F 12/24 460/110 |
| 2,457,259 | A | * | 12/1948 | Moll | A01F 12/24 241/190 |
| 3,439,684 | A | * | 4/1969 | Rathje | A01F 12/24 460/110 |
| 3,515,145 | A | * | 6/1970 | Herbsthofer | A01F 12/24 460/110 |
| 3,537,459 | A | * | 11/1970 | Thomas | A01F 12/20 460/110 |
| 3,568,682 | A | * | 3/1971 | Knapp | A01F 12/24 460/108 |
| 3,678,938 | A | * | 7/1972 | De Coene | A01F 12/442 460/73 |
| 3,734,103 | A | * | 5/1973 | Mathews | A01F 7/06 460/108 |
| 3,871,384 | A | * | 3/1975 | Depauw | A01F 12/00 460/109 |
| 3,891,152 | A | * | 6/1975 | Guggenheimer | B02C 13/284 241/73 |
| 4,031,901 | A | * | 6/1977 | Rowland-Hill | A01F 12/24 460/108 |
| 4,383,652 | A | * | 5/1983 | Osborne | A01F 29/06 241/101.742 |
| 4,711,075 | A | * | 12/1987 | Strong | A01F 12/24 460/110 |
| 4,711,252 | A | * | 12/1987 | Bernhardt | A01F 12/28 460/107 |
| 4,909,772 | A | * | 3/1990 | Kuchar | A01F 12/24 460/110 |
| 4,988,326 | A | * | 1/1991 | Bennett | A01F 12/24 460/108 |

(Continued)

FOREIGN PATENT DOCUMENTS

DE  3303413 A1 * 8/1984 ............. A01F 12/24

Primary Examiner — Árpád Fábián-Kovács
(74) Attorney, Agent, or Firm — Michael W. Goltry; Robert A. Parsons; Parsons & Goltry

(57) ABSTRACT

A concave for an agricultural combine includes first and second frames connected together for movement between closed and open positions. The first frame includes curved members axially spaced from one another, and bars each movable between a first position removably connected to the first frame and a second position detached from the first frame, wherein the bars are spaced from one another and extend axially between the curved members forming openings therebetween for grain to pass through in the first position of each of the bars. The second frame restricts movement of each of the bars between the first and second positions in the closed position of the first and second frames, and the second frame allows movement of each of the bars between the first and second positions in the open position of the first and second frames.

18 Claims, 17 Drawing Sheets

(56) References Cited

U.S. PATENT DOCUMENTS

| | | | | |
|---|---|---|---|---|
| 5,024,631 A * | 6/1991 | Heidjann | A01F 12/26 460/109 |
| 5,919,087 A * | 7/1999 | Strong | A01F 12/24 460/109 |
| 6,193,604 B1 * | 2/2001 | Ramp | A01F 12/24 460/109 |
| 6,485,364 B1 * | 11/2002 | Gryspeerdt | A01D 41/1271 460/107 |
| 7,285,043 B2 * | 10/2007 | Foster | A01F 12/24 460/110 |
| D624,939 S * | 10/2010 | Flickinger | D15/28 |
| 8,454,416 B1 * | 6/2013 | Estes | A01F 12/24 460/107 |
| 8,628,390 B2 * | 1/2014 | Baltz | A01F 12/24 460/109 |
| 8,721,411 B2 * | 5/2014 | Reiger | A01F 12/26 460/108 |
| 9,215,845 B2 * | 12/2015 | Regier | A01F 12/446 |
| 2005/0197176 A1 * | 9/2005 | Foster | A01F 12/24 460/108 |
| 2007/0178951 A1 * | 8/2007 | Voss | A01F 12/28 460/109 |

\* cited by examiner

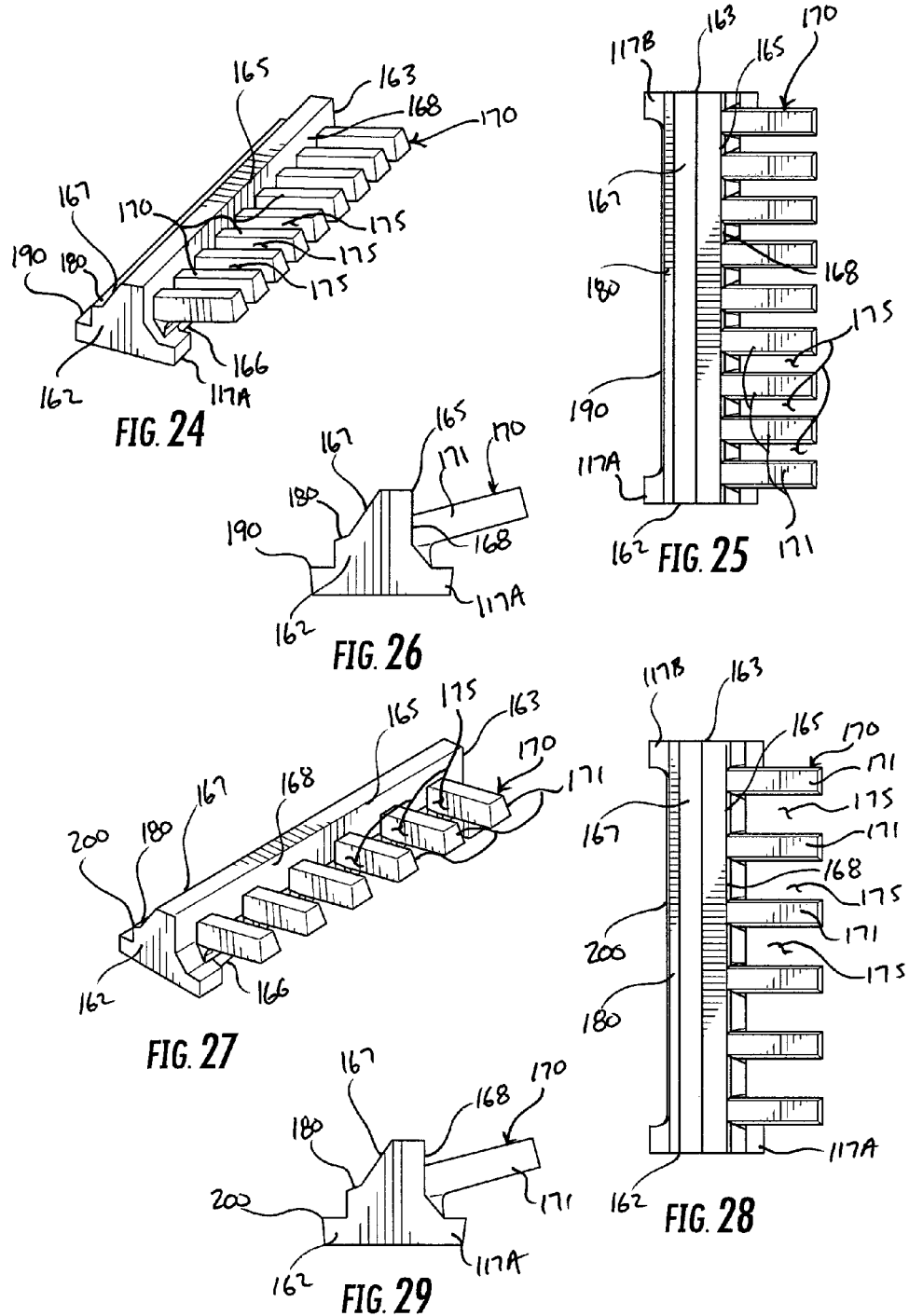

REMOVABLE CONCAVE THRESHING BARS FOR AN AGRICULTURAL COMBINE

FIELD OF THE INVENTION

The present invention relates to agricultural combines and, more particularly, to concaves for agricultural combines.

BACKGROUND OF THE INVENTION

Agricultural combines are large machines that harvest, thresh, separate and clean an agricultural crop. The resulting clean grain is stored in a grain tank located on the combine. The clean grain is transported from the grain tank to a truck, grain cart or other receiving bin by an unloading auger.

In general, an agricultural combine includes a harvesting platform, a feederhouse, a threshing drum mounted in close proximity to a concave, sieves, a collection or bulk tank, and various conveyors, such as rotating belts and spinning augers. The harvesting platform gathers and cuts the crop near ground level and directs the harvested crop to the feederhouse, which applies the harvested crop to the threshing drum. The harvested crop is threshed between the rotating threshing drum and the concave separating the grains from the chaff to form threshings, namely, the chaff and the separated grains. The threshings are applied to a cleaning system, which separates the grains from the chaff, applies the grains to the collection or bulk tank that is periodically emptied into a truck, grain cart or other receiving bin by an unloading auger, and discharges the chaff onto the field.

The concave generally includes an array of straight bars that extend parallel to the threshing drum axis of rotation. The curved bars are permanently welded to curved end members. Curved wires, which project through the bars in some concaves and that underlie the bars in other concave designs, extend circumferentially along the concave. A concave of this type forms a grate through which the majority of the threshed grain and chaff fall onto a collecting assembly where it is directed to the cleaning system of the combine.

A concave must be periodically replaced when the bars wear down or when they are bent or broken by rocks, wire, and other foreign matter that is inadvertently drawn into the combine. Replacing a concave is difficult and time-consuming work, and especially costly when the need arises during a harvest. Accordingly, there is a need in the art for a concave that is easily and inexpensively serviceable without the need for replacement or removal from a combine, and that is easy to construct and assemble, and that eliminates extended downtimes during harvest.

SUMMARY OF THE INVENTION

According to the principle of the invention, a concave for an agricultural combine includes first and second frames connected together for movement between closed and open positions. The first frame includes curved members axially spaced from one another, and bars each movable between a first position removably connected to the first frame and a second position detached from the first frame. The bars are spaced from one another and extend axially between the curved members forming openings therebetween for grain to pass through in the first position of each of the bars. The second frame restricts movement of each of the bars between the first and second positions in the closed position of the first and second frames. The second frame allows movement of each of the bars between the first and second positions in the open position of the first and second frames. The first and second frames are pivotally connected for movement between the closed and open positions. The second frame includes curved stops axially spaced from one another, and in the closed position of the first and second frames the curved stops are juxtaposed on either side of the respective curved members so as to restrict movement of each of the bars between the first and second positions. There is an engagement assembly for removably connecting each of the bars in the first position thereof to the first frame including elements thereof carried by each of the bars and complemental elements thereof carried by the first frame. In the first position of the bars the engagement assemblies prevent axial rotation of the bars relative to the first frame. Each of the elements is one of a tongue and a slot, and each of the complemental elements is the other one of the tongue and the slot.

According to the principle of the invention, a concave for an agricultural combine includes first and second frames connected together for movement between closed and open positions. The first frame includes curved members axially spaced from one another, and bars each formed with a separating grate. The bars are each movable between a first position removably connected to the first frame and a second position detached from the first frame. In the first position of each of the bars, the bars are spaced from one another and extend axially between the curved members forming openings therebetween for grain to pass through, and the separating grate of each bar extends across an adjacent opening to an adjacent bar for separating grain from threshed crop material. The second frame restricts movement of each of the bars between the first and second positions in the closed position of the first and second frames. The second frame allows movement of each of the bars between the first and second positions in the open position of the first and second frames. In the first position of each of the bars the separating grate of each bar is in direct contact against a shoulder of the adjacent bar. The separating grate of each bar consists of parallel fingers axially spaced from one another. The first and second frames are pivotally connected for movement between the closed and open positions. The second frame includes curved stops axially spaced from one another, and in the closed position of the first and second frames the curved stops are juxtaposed on either side of the respective curved members so as to restrict movement of each of the bars between the first and second positions. There is an engagement assembly for removably connecting each of the bars in the first position thereof to the first frame including elements thereof carried by each of the bars and complemental elements thereof carried by the first frame. In the first position of the bars the engagement assemblies prevent axial rotation of the bars relative to the first frame. Each of the elements is one of a tongue and a slot, and each of the complemental elements is the other one of the tongue and the slot.

According to the principle of the invention, a concave for an agricultural combine includes a frame having curved members axially spaced from one another, and bars each formed with a separating grate. The bars are spaced from one another and extend axially between the curved members forming openings therebetween for grain to pass through, and the separating grate of each bar extends across an adjacent opening to an adjacent bar for separating grain from threshed crop material. The separating grate of each bar includes parallel fingers axially spaced from one another.

The parallel fingers of each bar each has a free end in direct contact against a shoulder of the adjacent bar.

According to the principle of the invention, a concave for an agricultural combine includes a frame assembly including first frames and a second frame connected together for movement between a closed position of the frame assembly and an open position of the frame assembly. Each of the first frames includes curved members axially spaced from one another, and bars each movable between a first position removably connected to the first frame and a second position detached from the first frame, wherein the bars are spaced from one another and extend axially between the curved members forming openings therebetween for grain to pass through in the first position of each of the bars. The second frame restricts movement of each of the bars of the first frames between the first and second positions in the closed position of the frame assembly. The second frame allows movement of each of the bars between the first and second positions in the open position of the frame assembly. The first frames and the second frames are pivotally connected for movement between the closed and open positions of the frame assembly. The second frame includes curved stops axially spaced from one another, and in the closed position of the first frames and the second frame the curved stops are juxtaposed on either side of one of the curved members of the respective first frames so as to restrict movement of each of the bars of the first frames between the first and second positions. There is an engagement assembly for removably connecting each of the bars in the first position thereof to a corresponding one of the first frames including elements thereof carried by each of the bars and complemental elements thereof carried by the corresponding one of the first frames. In the first position of the bars the engagement assemblies prevent axial rotation of the bars relative to the corresponding one of first frames. Each of the elements is one of a tongue and a slot, and each of the complemental elements is the other one of the tongue and the slot.

According to the principle of the invention, a concave for an agricultural combine includes a frame assembly including first frames and a second frame connected together for movement between a closed position of the frame assembly and an open position of the frame assembly. Each of the first frames includes curved members axially spaced from one another, and bars each formed with a separating grate, the bars each movable between a first position removably connected to the first frame and a second position detached from the first frame, and in the first position of each of the bars the bars are spaced from one another and extend axially between the curved members forming openings therebetween for grain to pass through, and the separating grate of each bar extends across an adjacent opening to an adjacent bar for separating grain from threshed crop material. The second frame restricts movement of each of the bars of the first frames between the first and second positions in the closed position of the frame assembly. The second frame allows movement of each of the bars between the first and second positions in the open position of the frame assembly. In the first position of each of the bars the separating grate of each bar is in direct contact against a shoulder of the adjacent bar. The separating grate of each bar includes parallel fingers axially spaced from one another. The first frames and the second frames are pivotally connected for movement between the closed and open positions of the frame assembly. The second frame includes curved stops axially spaced from one another, and in the closed position of the first frames and the second frame the curved stops are juxtaposed on either side of one of the curved members of the respective first frames so as to restrict movement of each of the bars of the first frames between the first and second positions. There is an engagement assembly for removably connecting each of the bars in the first position thereof to a corresponding one of the first frames including elements thereof carried by each of the bars and complemental elements thereof carried by the corresponding one of the first frames. In the first position of the bars the engagement assemblies prevent axial rotation of the bars relative to the corresponding one of first frames. Each of the elements is one of a tongue and a slot, and each of the complemental elements is the other one of the tongue and the slot.

BRIEF DESCRIPTION OF THE DRAWINGS

Referring to the drawings:

FIG. 24 is a perspective view of an alternate embodiment of a bar formed with an integrated grate according to the principle of the invention;

FIG. 25 is a top plan view of the embodiment of FIG. 24;

FIG. 26 is a side elevation view of the embodiment of FIG. 24, the opposite side elevation view being the same thereof;

FIG. 27 is a perspective view of an alternate embodiment of a bar formed with an integrated grate according to the principle of the invention;

FIG. 28 is a top plan view of the embodiment of FIG. 27; and

FIG. 29 is a side elevation view of the embodiment of FIG. 27, the opposite side elevation view being the same thereof.

DETAILED DESCRIPTION

Figure 1:
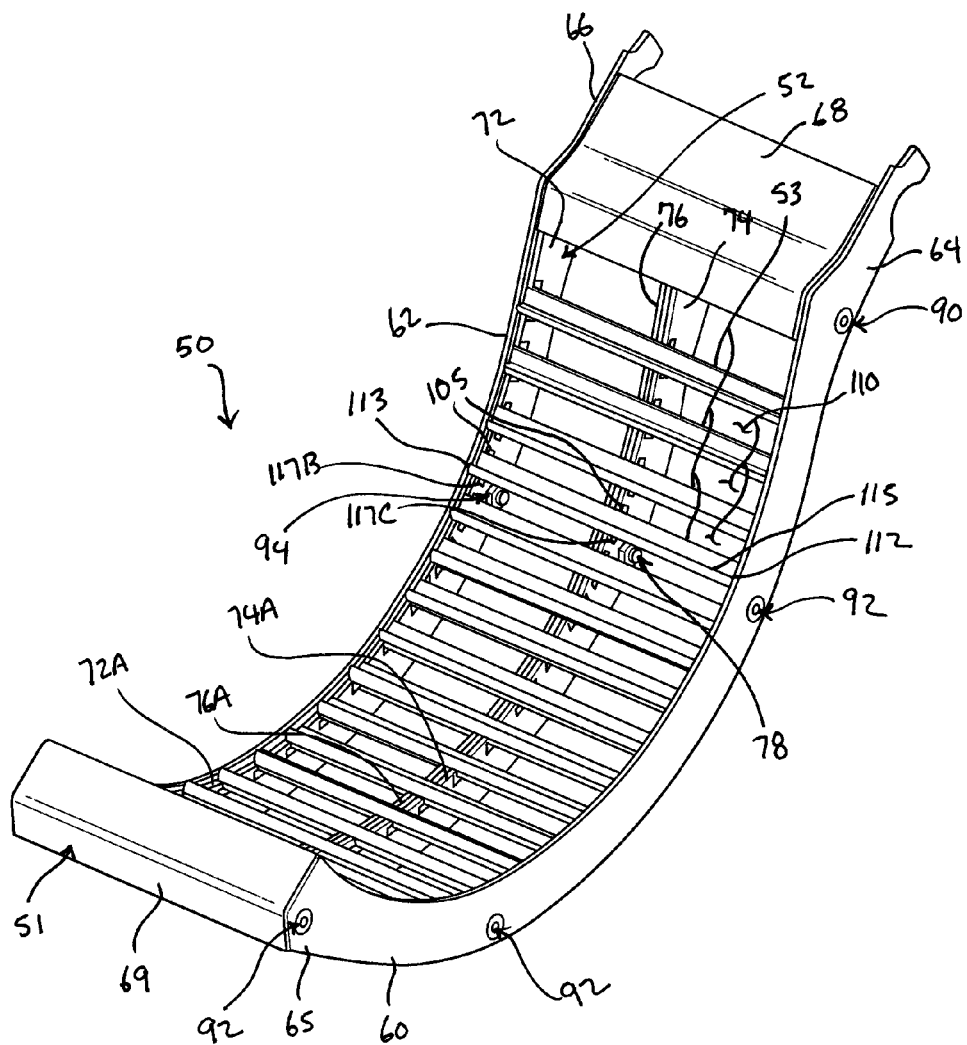
FIGS. 1-3 are perspective views of a concave section constructed and arranged in accordance with the principle of the invention, the concave section includes parallel bars carried by an inner frame connected to an outer frame.

A known agricultural combine includes a harvesting platform for harvesting a crop and directing it to a feederhouse. The harvested crop is applied from the feederhouse to a rotary crop processing unit that threshes and separates the harvested crop. The rotary crop processing unit includes a rotating threshing drum or rotor radially surrounded by a casing that together define an inlet section, a threshing section, and a separating section. The rotor is a hollow cylindrical drum having a numerous crop processing elements that engage the harvested crop and rotate it in the casing. The bottom of the casing has a concave under the threshing section and a separating grate under the separating section. Grain and chaff falling through the concave and the separating grate are directed to a cleaning system, which removes the chaff and directs the clean grain to a clean grain elevator that conveys the clean grain to a grain or bulk tank. The clean grain in the bulk tank is periodically unloaded into a grain cart or truck by an unloading auger, and the threshed and separated chaff is discharged from the combine through an outlet at the rear of the combine. The customary discharge beater at the rear of the combine propels the discharged chaff onto the field. The operation of the combine is controlled from an operator's cab.

The present invention is directed to the concave located under the threshing section of the rotary processing unit. One concave section is used to form the concave, or a plurality of concave sections are used to form the concave. A concave section 50 constructed and arranged in accordance with the principle of the invention is shown in FIGS. 1-8. Concave section 50 incorporates numerous hardware fasteners in the form of conventional nut-and-bolt assemblies. Each nut-and-bolt assembly in concave section 50 includes the customary bolt and the customary corresponding nut. The bolt is inserted through corresponding openings in the pieces to be connected, the nut is threaded onto the threaded shank of the bolt, and the nut is tightened via rotation so as to secure the connected pieces between the head of the bolt and the nut threaded onto the threaded shank of the bolt. This operation is reversed to detach the connected pieces. This is a normal and customary nut-and-bolt fastening assembly. For clarity, different reference numerals are used to call out the various nut-and-bolt assemblies of concave section 50.

Referencing FIGS. 1-8 in relevant part, concave section 50 includes frame 51, frame 52, and threshing elements or bars 53. Bars 53 carried by frame 52 provide aggressive threshing edges. Bars 53 are independently removably connected to frame 52 so as to be selectively and independently attached to or otherwise installed on frame 52 in preparation for threshing and detached or otherwise released from frame 52 for individual bar 53 repair or replacement. Frames 51 and 52 cooperate to form a frame assembly, and are connected together for movement between a nested or closed position in FIGS. 1-3 so as to define the nested or closed position of the frame assembly and also concave section 50, and an open position in FIGS. 4, 5, and 7 so as to define the open position of the frame assembly and also concave section 50. In the closed position as in FIGS. 1-3, there is an interaction between frame 51 and bars 53 removably connected to frame 52, which holds and locks or otherwise secures bars 53 in place to the frame assembly in preparation for threshing. In the open position as in FIGS. 4, 5, and 7, frames 51 and 52 are spread apart, such that bars 53 are free from the influence of frame 51 so as to allow bars 53 to be readily, independently, and selectively removed, detached, or otherwise de-united from frame 52, and readily, independently, and selectively attached, installed, or otherwise united to frame 52, such as for bar repair or bar replacement purposes. Frame 51 is an outer frame, and frame 52 is an inner frame in that frame 52 is positioned within frame 51 in the nested or closed position of concave section 50. Frames 51 and 52, and bars 53 are made of the customary steel as is normal in the art of concaves.

Referencing in relevant part FIGS. 1-5, FIG. 7, and FIG. 8, frame 51 includes members 60 and 62. Members 60 and 62 are end members and are substantially identical and coextensive. Members 60 and 62 are thin and elongate and are axially spaced from one another and extend parallel to one another, and are curved to extend circumferentially about a portion of the rotor of the rotary processing unit. Given that members 60 and 62 are end members and are curved, they may be referred to as either curved members, or curved end members. Curved end member 60 has opposite ends 64 and 65, and curved end member 62 has opposite ends 66 and 67. Transverse support member 68 extends between and is joined to ends 64 and 66 of curved members 60 and 62 via welding, and transverse support member 69 extends between and is joined to ends 65 and 67 of curved end members 60 and 62 via welding. Transverse support members 68 and 69 are relatively thin, elongate plates.

Frame 52 includes members 70, 72, 74, and 76. Members 70, 72, 74, and 76 are substantially identical and coextensive. Members 70 and 72 are thin and elongate and are axially spaced from one another, and members 74 and 76 are thin and elongate and are axially juxtaposed relative to each other and axially spaced from members 70 and 72. Members 70, 72, 74, and 76 extend parallel relative to each other, and relative to members 60 and 62. Members 70 and 72 are the outermost or end members of frame 52, and members 74 and 76 are between members 70 and 72 and are the innermost or intermediate members of frame 52. Members 74 and 76 are substantially equidistant between members 70 and 72, and extend parallel to one another. Member 74 is axially positioned alongside member 76 and is between member 76 and member 70. Member 76 is axially positioned alongside member 74 and is between member 74 and member 72. Members 74 and 76 are releasably connected to each other with fasteners, here in the form of two nut-and-bolt assemblies 78, which are longitudinally spaced apart between, on the one hand, ends 84 and 86, and, on the other hand, ends 85 and 87. Less or more such assemblies 78 can be used. Members 70, 72, 74 and 76 are curved like that of end members 60 and 62 to similarly extend circumferentially about a portion of the rotor of the rotary processing unit. Members 60, 62, 70, 72, 74, and 76 have matching curvatures. Given that members 70 and 72 are end members and are curved, they may be referred to as either curved members, or curved end members. Given that members 74 and 76 are intermediate members and are curved, they may be referred to as either curved members, or curved intermediate members. Curved end member 70 has opposed ends 80 and 81, curved end member 72 has opposed ends 82 and 83, curved intermediate member 74 has opposed ends 84 and 85, and curved intermediate member 76 has opposed ends 86 and 87.

Figure 2:
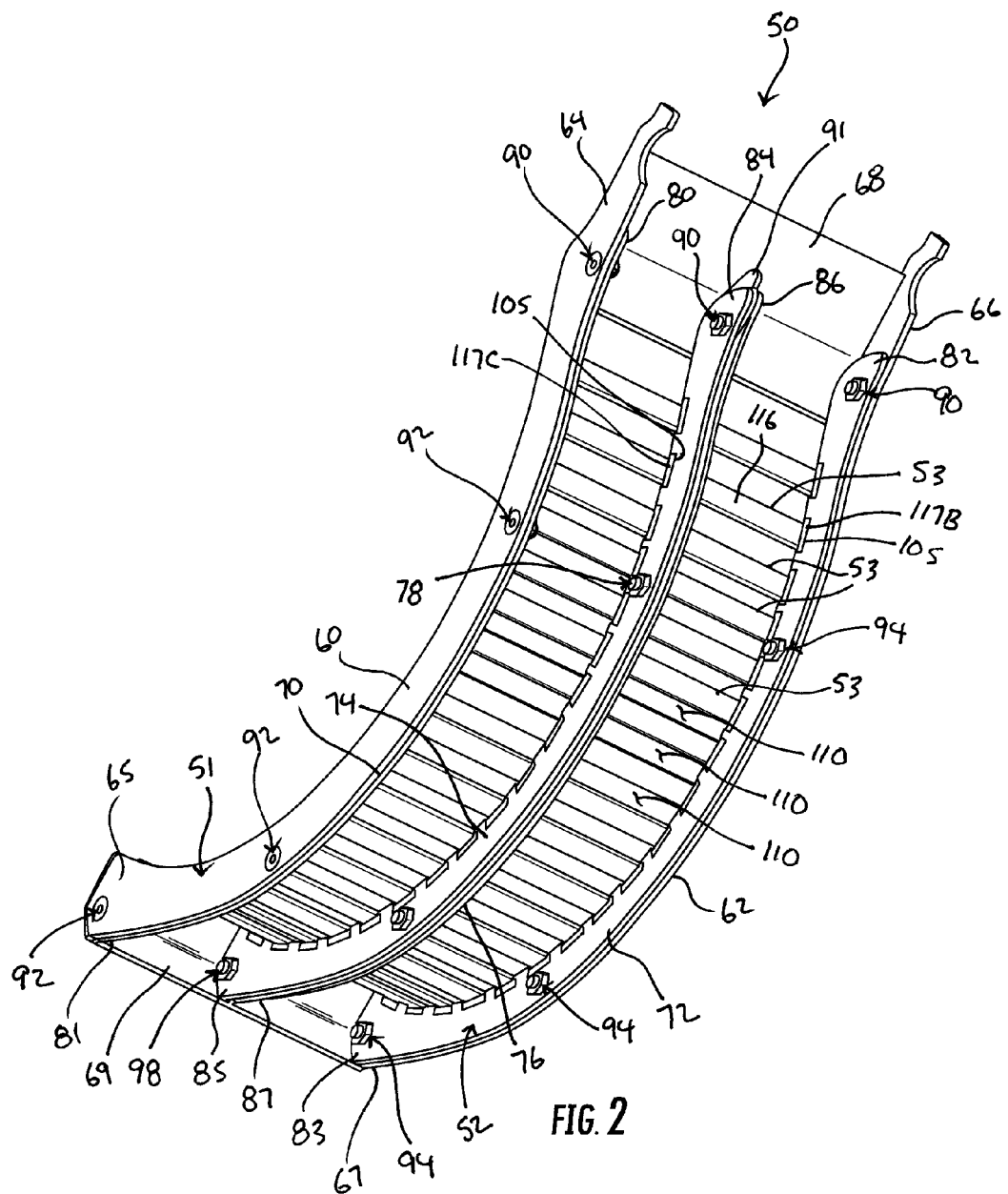
Figure 3:
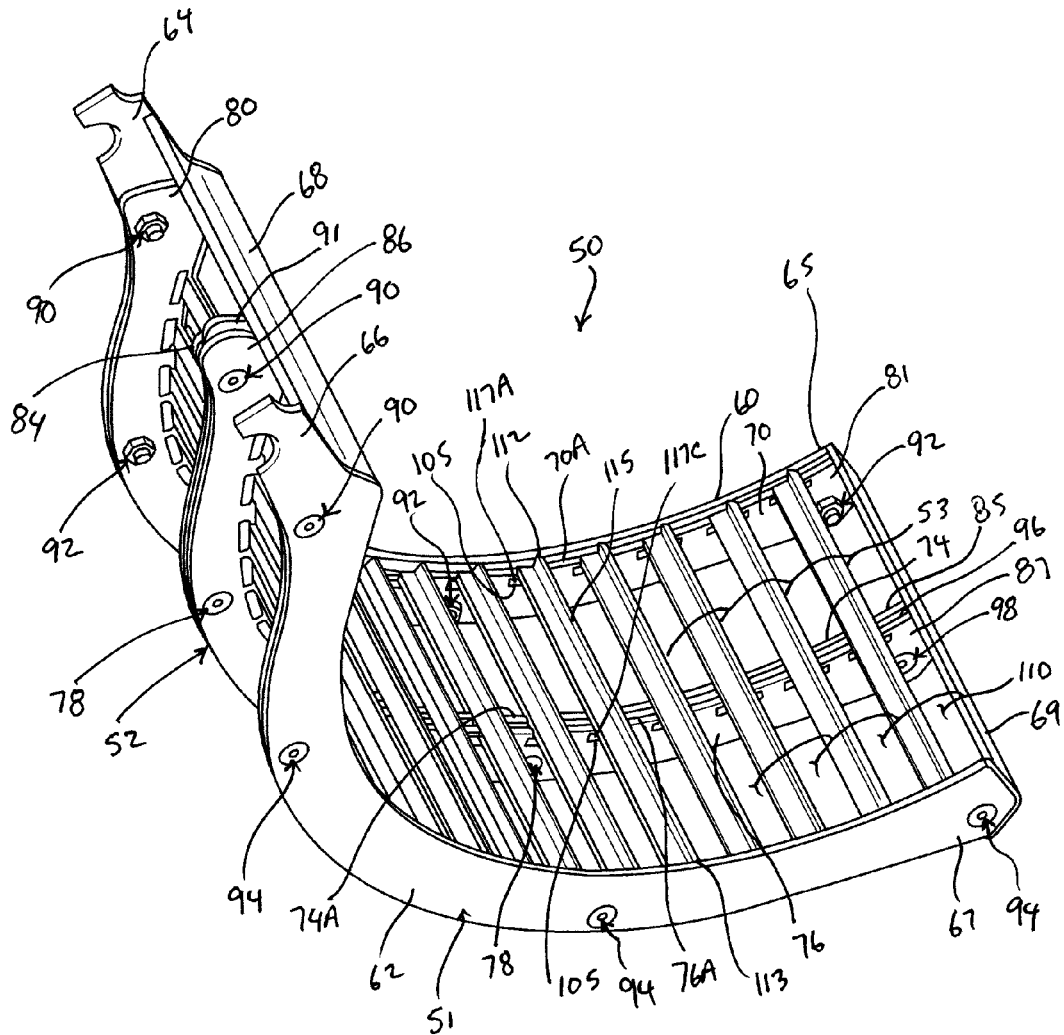
Figure 4:
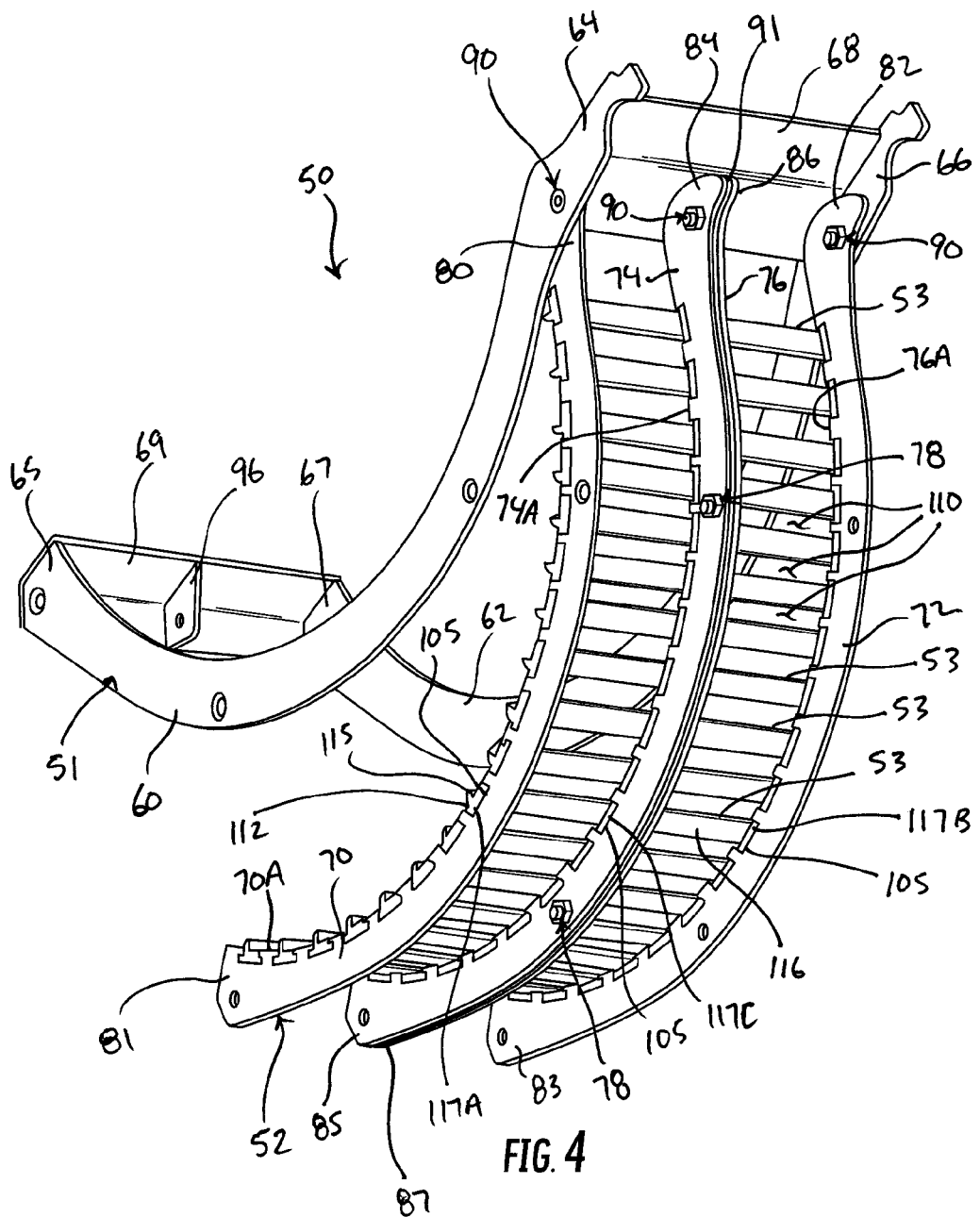
FIG. 4 is a perspective view of the embodiment of FIGS. 1-3 shown as it would appear open.
Figure 5:
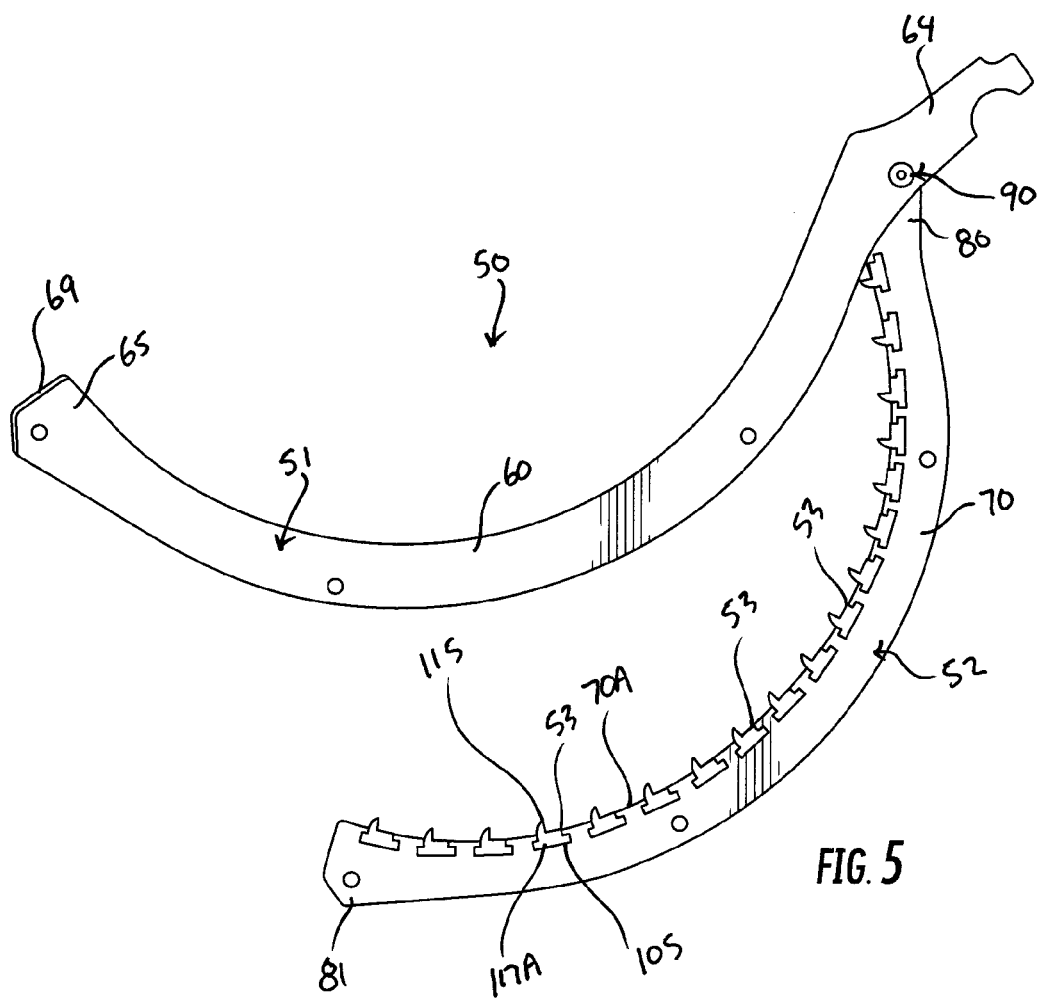
FIG. 5 is a side elevation view of the embodiment of FIG. 4.
Figure 7:
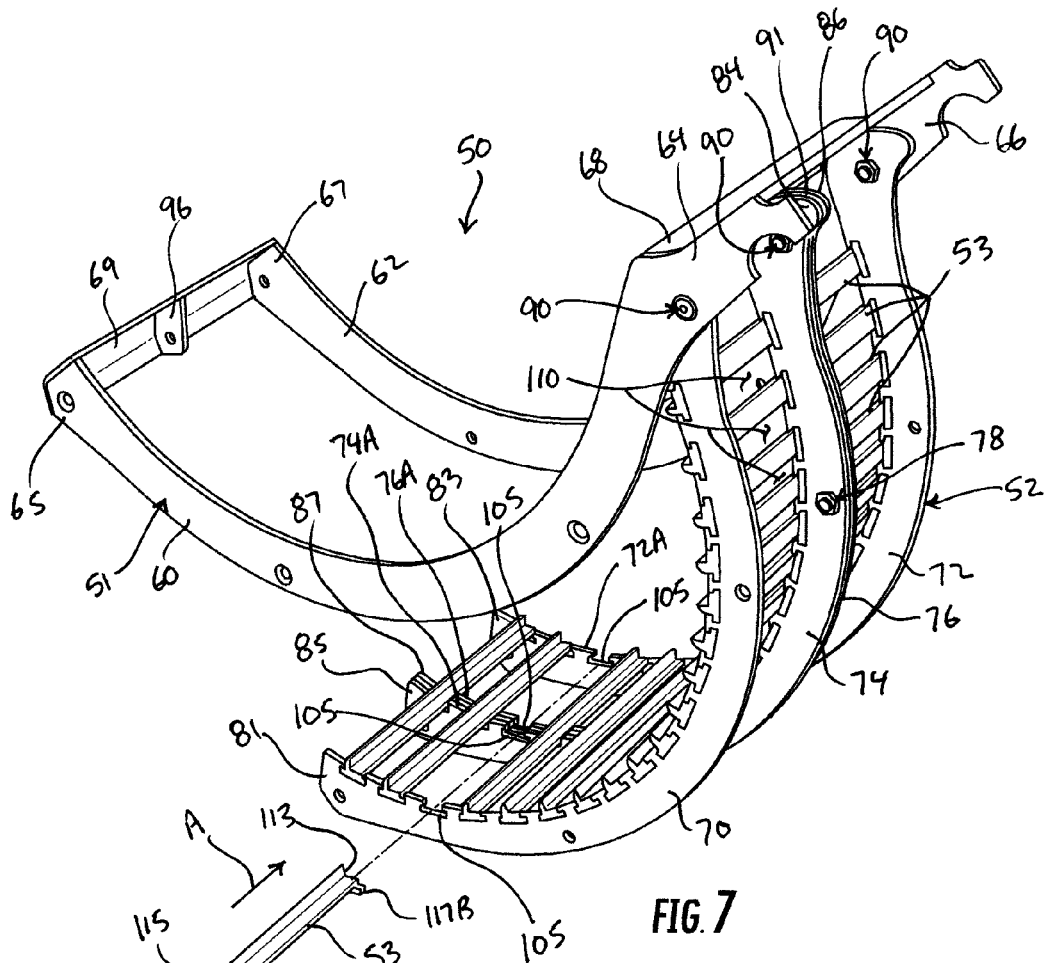
FIG. 7 is a view similar to that of FIG. 4 illustrating a bar removed from the inner frame of the concave section.

Frames 51 and 52 are connected together so as to be movable between the nested or closed position in FIGS. 1-3 in the assembly of concave section 50 in preparation for threshing in which frames 51 and 52 are axially aligned, and the open position in FIGS. 4, 5, and 7 in which frames 51 and 52 are spread apart like co-acting jaws for bar 53 maintenance and replacement purposes. Curved end member 70 is juxtaposed along, and is in direct contact against, the inner side of curved end member 60, and curved end member 72 is juxtaposed along, and is in direct contact against, the inner side of curved end member 62. End 80 of curved end member 70 is connected to end 64 of curved end member 60, end 82 of curved end member 72 is connected to end 66 of curved end member 72, and ends 84 and 86 of curved intermediate members 74 and 76 are connected to transverse support member 68 at an intermediate location between end 80 of curved end member 70 connected to end 64 of curved end member 60, and end 82 of curved end member 72 connected to end 66 of curved end member 62. The connections of ends 80, 82, 84, and 86 of frame 52 to frame 51 are pivotal connections, here via nut-and-bolt fasteners 90, that provide concurrent pivotal movement of members 70, 72, 74, and 76 that make up frame 52 between a first position downwardly and away from frame 51 as in FIGS. 4, 5, and 7 so as to define the open position of frame 52 and, moreover, the open position of the frame assembly and of concave section 50, and a second position upwardly toward frame 52 as in FIGS. 1-3 so as to define the nested or closed position of frame 52 and, moreover, the nested or closed position of the frame assembly and of concave section 50. Ends 64 and 80 are pivotally connected with one nut-and-bolt fastener 90, ends 82 and 66 are pivotally connected with one nut-and-bolt fastener 90, and ends 84 and 86 are pivotally connected to transverse support member 68 with one nut-and-bolt fastener 90. As seen in FIGS. 2 and 3, transverse support member 68 has an intermediate lug 91 formed on its under or inner side. Lug 91 is equidistant between ends 64 and 66 of curved end members 60 and 62. Lug 91 extends between ends 84 and 86 of curved intermediate members 74 and 76, and one nut-and-bolt assembly 90 pivotally connects lug 91 to ends 84 and 86 on either side of lug 91. Pivot pins or other forms of pivotal connections or fasteners can be used to pivotally connect ends 80, 82, 83, and 84 of frame 52 to described connecting points of frame 51 without departing from the invention.

And so ends 80, 82, 84, and 86 of frame 52 are mounted to frame 51 for pivotal movement, here via nut-and-bolt fasteners 90, for movement between the first or open position of frame 52 extending downwardly and away from frame 51 as in FIGS. 4, 5, and 7 so as to define the open position of the frame assembly and of concave section 50, and the second or nested or closed position of frame 52 upwardly toward and within frame 51 as in FIGS. 1-3 so as to define the nested or closed position of the frame assembly and of concave section 50. In the nested or closed position with reference in relevant part to FIGS. 1-3 and 8, frame 52 is within frame 51, curved end member 70 extends parallel to and is axially juxtaposed along and is in direct contact with the inner side of curved end member 60 that in turn extends parallel to and is axially juxtaposed along the outer side of curved end member 60, curved end member 72 extends parallel to and is axially juxtaposed along and is in direct contact with the inner side of curved end member 62 that in turn extends parallel to and is axially juxtaposed along the outer side of curved end member 62, and parallel and axially juxtaposed curved intermediate members 74 and 76 extend parallel relative to curved end members 60, 62, 70 and 72 and are equidistant between and are axially spaced from curved end members 70 and 72 extending parallel along the inner sides of the respective curved end members 60 and 62. Curved end member 70 extends concurrently along the length of curved end member 60 of frame 51 from end 80 connected to end 64, to end 81 at end 65 at the inner side of transverse support member 69. Curved end member 72 extends concurrently along the length of curved end member 62 of frame 51 from end 82 connected to end 66, to end 83 at end 67 at the inner side of transverse support member 69. Curved intermediate members 74 and 76 extend concurrently along the length of frame 51 from ends 84 and 86 connected to transverse support member 68 to ends 85 and 87 at the inner side of transverse support member 69.

Fasteners are used to removably connect frame 52 to frame 51 in the second or closed position of frame 52 defining the nested or closed position of frames 51 and 52 so as to secure concave section 50 in the nested or closed position in preparation for threshing. Specifically, end members 60 and 70 are releasably connected to each other with longitudinally spaced fasteners, here in the form of three nut-and-bolt assemblies 92 and less or more of such assemblies 92 can be used, and end members 62 and 72 are releasably connected to each other with longitudinally spaced fasteners, here in the form of three nut-and-bolt assemblies 94 and lest or more of such assemblies 84 can be used. As seen in FIGS. 4 and 7, transverse support member 69 has an intermediate lug 96 formed on its inner side equidistant between ends 64 and 66 of curved end members 60 and 62. In the second position of frame 52 defining the nested or closed position of frames 51 and 52, lug 91 is applied between ends 85 and 87 of curved intermediate members 74 and 76 as shown in FIG. 3, and one fastener, here in the form of one nut-and-bolt assembly 98, releasably connects lug 96 to ends 85 and 87 on either side of lug 96, and this further secures concave section 50 in its nested or closed position.

In FIGS. 1-5, 7, and 8, frame 52 carries bars 53. Bars 53 are identical and are spaced from one another and are parallel relative to each other and extend axially between curved end members 70 and 72, and across curved intermediate members 74 and 76, forming openings 110 therebetween for grain to pass through, as shown in FIGS. 1-4. Referencing the bar 53 in FIG. 7 shown removed from frame 52 of concave section 50, each bar 53 is elongate and longitudinally straight and integrally formed via machining or molding and has opposed ends 112 and 113, an upper aggressive threshing edge 115 that extends between ends 112 and 113 and a lower end 116 that extends between ends 112 and 113. Bars 53 are each independently removably connected to frame 52 via an engagement assembly. Each engagement assembly for removably connecting each of the bars 53 to frame 52 includes elements thereof carried by each of the bars 53 and complemental elements thereof carried by frame 52, specifically members 70, 72, 74, and 76. The element and the complemental element of each engagement assembly are a tongue 117 and a slot 105, respectively. Tongue 117, which is exemplary of a male engagement element, and slot 105, which is exemplary of a female engagement element, have conforming or complementing shapes that allow them to interlock. Although the element of each engagement assembly is tongue 117 and the complemental element of each engagement assembly is slot 105, this arrangement can be reversed.

Figure 6:
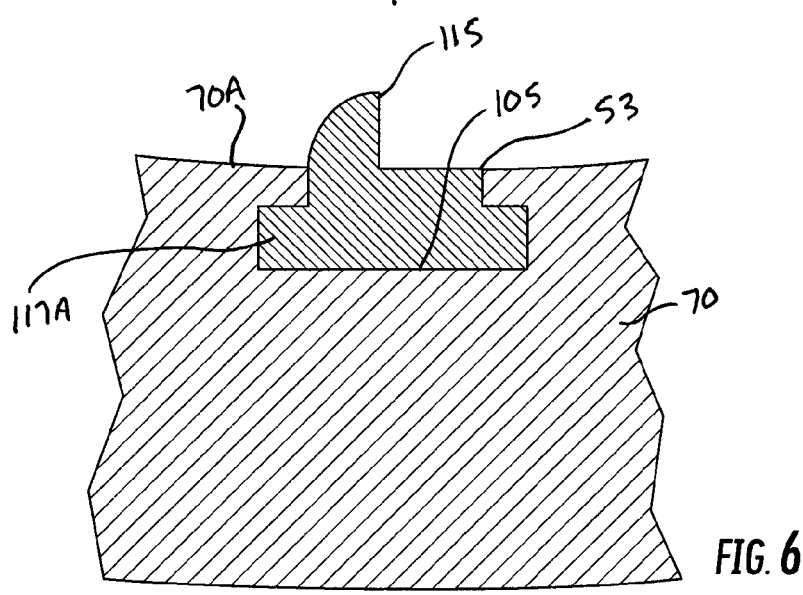
FIG. 6 is a transverse section view illustrating an engagement assembly between a bar and a curved member of the concave section of FIGS. 1-5.

Referencing FIGS. 1-5 and 7 in relevant part, members 70, 72, 74, and 76 have top edges 70A, 72A that lie along a common curved surface to extend circumferentially about a portion of the rotor of a rotary processing unit. Members 70, 72, 74, and 76 each have slots 105. Slots 105 are identical and are identically longitudinally spaced along the lengths of the respective members 70, 72, 74, and 76. Slots 105 are formed in top edges 70A, 72A, 74A, and 76A of the respective members 70, 72, 74, and 76. FIG. 6 shows one such slot 105 in top edge 70A of member 70. Slots 105 in top edge 70A of member 70 are axially aligned or otherwise correspond with the slots 105 in top edges 72A, 74A, and 76A of the other members 72, 74, and 76. The slots 105 of each set of axially aligned slots 105 of members 70, 72, 74, and 76 form the complemental elements of an engagement assembly that relate to the elements of the engagement assembly of each corresponding bar 53.

Each bar 53 has three axially spaced tongues 117 formed in lower end 116, including end tongue 117A near end 112, end tongue 117B near end 113, and intermediate tongue 117C equidistant between end tongues 117A and 117B. The tongues 117A, 117B, and 117C of each bar 53 form the elements of the engagement assembly that relate to the complemental elements of the engagement assembly defined by the slots 105 of each set of axially aligned slots 105 of members 70, 72, 74, and 76. Tongues 117A, 117B, and 117C of each bar 53 are seated in a set of axially aligned slots 105 of the corresponding members 70, 72, 74, and 76. Tongues 117A are seated in slots 105 of curved end member 70, tongues 117B are seated in corresponding slots 105 of curved end member 72, and tongues 117C are seated the corresponding slots 105 of curved intermediate members 74 and 76. In this embodiment, slots 105 and tongues 117A, 117B, and 117C of the engagement assemblies have corresponding T-shapes, which secure bars 52 prevent axial rotation of the bars 53 relative to frame 52, permit movement of bars 53 along only one axis, which is the longitudinal axis of each bar 53, and restrict movement of each bar 53 in any other axis or direction, including axes/directions that are transverse or perpendicular relative to the curvature of frame 52. FIG. 6 shows one tongue 117A of one bar 53 seated in one slot 105 in top edge 70A of member 70.

The bars 53, including at their opposite ends 112 and 113, are not affixed so as to be immovable using any suitable technique, such as by welding, to members 70, 72, 74, after uniting the elements and the complemental elements of each engagement assembly removably connecting each bar 53 to frame 52. Because of this, bars 53 are left removably connected to frame 52 simply by seating/inserting the tongues 117 of each bar into a corresponding set of axially aligned slots 105 in members 70, 72, 74, and 76, and readily removed from frame 52 by releasing the tongues 117 of each bar 53 from the corresponding set of axially aligned slots 105 in members 70, 72, 74, and 76.

Installation of each bar 53 is carried out simply by axially aligning its tongues 117 with a preselected set of axially aligned slots of members 70, 72, 74, and 76, and then moving the bar 53 axially along its longitudinal axis so as to concurrently slide tongue 117A into the preselected slot 105 of member 70, tongue 117B into the corresponding slot 105 of member 72, and tongue 117C concurrently into the corresponding slots 105 of members 74 and 75. The removal of each bar 53 is done simply by reversing this operation. This way, the bars 53 may be readily attached or united to frame 52 and detached or de-united from frame 52 as desired, such as for repair or replacement in the case of bar 53 wear or damage. And when bars 53 are so removably connected to frame 52, the tongues 117 of the bars 53 are seated in the shape-conforming slots 105 formed in members 70, 72, 74, and 76 at their respective top edges 70A, 72A, 74A, and 76A, and the threshing edges 115 extend above top edges 70A, 72A, 74A and 76A of the respective members 70, 72, 74, and 76 of frame 52 so as to be located for threshing a harvested crop. FIG. 6 not only shows one tongue 117A of one bar 53 seated in one slot 105 in top edge 70A of member 70, but also shows one threshing edge 115 extending above top edge 70A.

As described above, the bars 53 are not affixed to frame 52 using any suitable technique, such as by welding, to members 70, 72, 74, and 76 so as to be permanently connected to frame 52, such that the only way to remove them would be to destroy such a permanent connection. The described engagement assembly between each bar 53 and frame 52 is a non-destructive, removable and impermanent connection, which means that the connection between the various tongues and slots does not require the destruction of the engagement assembly, such as by cutting, in order to remove the various bars 53 from frame 52.

Figure 8:
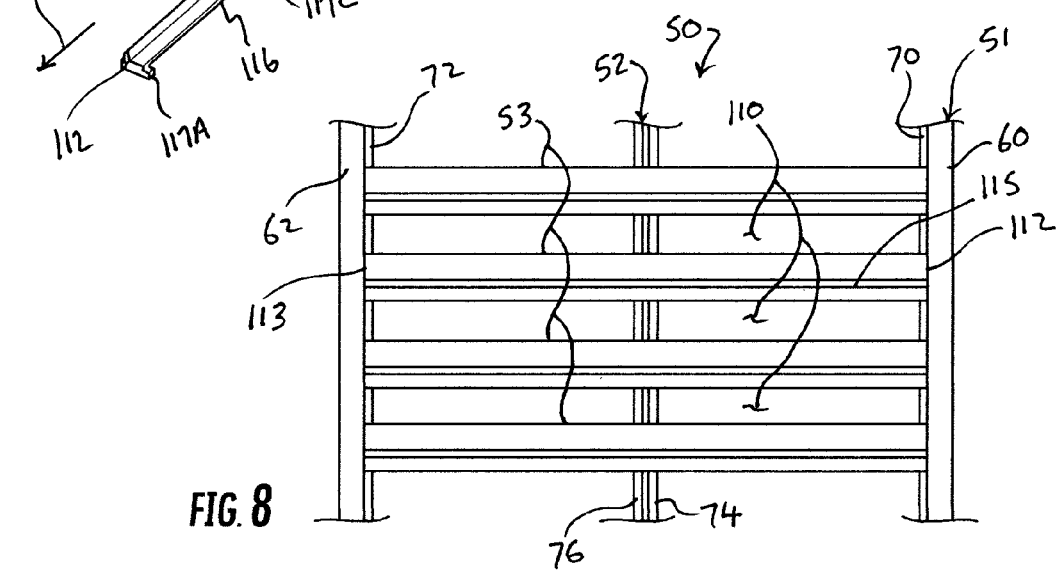
FIG. 8 is a top plan view of a section of the concave section of FIGS. 1-3 illustrating the outer frame capturing bars carried by the inner frame.

To removably install bars 53 on frame 52 in an example, frame 52 is located in the open position as in FIGS. 4, 5, and 7, and each bar 53 is removably connected to frame 52 by axially aligning its tongues 117 with a preselected set of axially aligned slots 105 of members 70, 72, 74, and 76, and then simply moving the bar 53 axially along its longitudinal axis so as to concurrently slide tongue 117A into the preselected slot 105 of member 70, tongue 117B into the corresponding slot 105 of member 72, and tongue 117C into the corresponding slots 105 of members 74 and 75. In FIG. 7 one bar 53 is shown positioned upright from lower end 116 to upper threshing edge 115 with its tongues axially aligned with a set of axially aligned slots 105 in preparation for installation on frame 52, which is carried out simply by moving bar 53 axially along its longitudinal axis in the direction of arrowed line A, whereby tongue 117B is passed sequentially through a slot 105 of member 70 and then through axially aligned slots 105 of members 74 and 76 to its final resting place in axially aligned slot 105 of member 72. As the bar 53 is so moved in the direction of arrowed line A, tongue 117C follows tongue 117B and passes first through slot 105 of member 70 to its final resting place in axially aligned slots 105 of members 74 and 76, and tongue 117A follows tongue 117C to its final resting place in the slot 105 of member 70. The removal of such bar 53 from frame 52 is done by reversing this operation simply by moving such bar axially along its longitudinal axis in the direction of arrowed B opposite to that of the direction of arrowed line A. The remaining bars 53 in FIG. 7 are installed in the same way and are shown so installed on frame 52, whereby each installed bar 53 extends axially from end 112 of bar 53 at member 70 and across members 74 and 76 to end 113 of bar 53 at member 72, which is also illustrated in FIG. 8. With further reference to FIG. 8, end 112 of each installed bar 53 is substantially flush with respect to the outer side of member 70, the opposed end 113 of each installed bar 53 is identically substantially flush with respect to the outer side of member 72, and the threshing edge 115 of each installed bar 53 extends above top edges 70A, 72A, 74A and 76A of the respective members 70, 72, 74, and 76 of frame 52 so as to be located for threshing a harvested crop. Openings 110 are formed between the installed bars 53 for grain to pass through. To removably install a bar 53 on frame 52 in another embodiment, the bar 53 can be simply positioned over frame 52 so as to axially align tongue 117A on one side of one slot 105 in member 70, axially align tongue 117B on one side of a corresponding slot 105 in member 72, and axially align tongue 117C on one side of corresponding slots 105 in members 74 and 76, and then the bar 53 can be moved in one direction along its longitudinal axis toward the respective slots 105 to concurrently insert the tongues 117 into the corresponding slots 105 to install the bar 53 on frame 52, and in the opposite direction to remove tongues 117 from the respective slots 105 to detach the bar 53 from frame 52.

In the open position of concave section 50 shown in FIGS. 4 5 and 7, frame 52 is pivoted away from frame 51 so as to extend downwardly and away from frame 52 from ends 80, 82, 84 and 86 connected to frame 52 to ends 81, 83, 85, and 87, which allows the selective installation and removal of bars 53 with respect to frame 52 without interference from frame 51. In other words, in the open position of concave section 50, frame 51 is pivoted away from bars 53 on frame 52 to allow movement of bars 53 between their installed and released positions relative to frame 52. Once all of the bars 53 are installed on frame 52 as in FIGS. 4 and 5, completion of the assembly of concave section 50 in preparation for threshing is done by securing concave section 50 into its nested or closed position by pivoting frame 52 upwardly in the direction of arrowed line C from its open position in FIGS. 4 and 5 to its nested or closed position in FIGS. 1-3 nested in frame 51, and then securing members 60 and 70 with nut-and-bolt assemblies 92, securing members 62 and 72 with nut-and-bolt assemblies 94, and securing members 74 and 76 to lug 91 with nut-and-bolt assembly 98.

In the nested or closed position of frame 52 defining the closed position of concave section 50 shown in relevant part in FIGS. 1-3 and 8, frame 51 interacts with bars 53 to restrict or otherwise restrain each of the bars 53 from moving between installed and released positions so as to secure and hold/lock bars 53 in place to frame 52 and, thus, to the frame assembly. Specifically, in the nested or closed positions of frame 51, curved end member 60 of frame 51 that extends parallel to and is axially juxtaposed along the outer side of curved end member 70 of frame 52 closely confronts and makes direct contact against ends 112 of bars 53 on one side of concave section 50, and curved end member 62 of frame 51 that extends parallel to and is axially juxtaposed along the outer side of curved end member 72 of frame 52 closely confronts and makes direct contact against the opposed ends 113 of bars 53 on the opposed side of concave assembly 50, whereby curved end members 60 and 62 thusly act as curved stops axially spaced from one another and juxtaposed on either side of the respective curved end members 70 and 72 of frame 52 and the respective ends 112 and 113 of the respective bars 53 functioning to capture bars 53 therebetween to restrict movement of bars 53 between their installed and released positions, and which also prevents the ability to install a bar 53 on frame 53 should one be inadvertently missing.

With concave section 50 so assembled, concave section 50 is ready for threshing in the customary manner in a rotary processing unit. In the rotary processing unit, bars 53 extend parallel to the axis of rotation of the rotating threshing drum, and upper threshing edges 115 extend upward from top edges 70A, 70B, 70C, and 70D of members 70, 72, 74, and 76 of frame 52 to provide aggressive threshing of the harvested crop and openings 110 between bars 53 are for grain to pass through. In a rotary combine, a single long concave section 50 can be utilized as the concave or multiple shorter concave sections 50 can be arranged end-to-end to form the concave. Should bars 53 become worn or damaged so as to require replacement or repair, nut-and-bolt fasteners 92, 94, and 98 are simply removed to release frame 52 from frame 51, and frame 52 is pivotally moved downwardly in the direction of arrowed line D in FIGS. 1-3 from the nested or closed position of frame 52 defining the closed position of the frame assembly and of concave section 50 to the open position of frame 52 in FIGS. 4, 5, and 7 defining the open position of the frame assembly and of concave section 50 to allow any of the bars needing replacement or repair to be easily removed, repaired or replaced, and reinstalled, in accordance with the principle of the invention. FIGS. 4 and 5 show frames 51 and 52 in the open position with the nut-and-bolt assemblies 92, 94, and 98, shown in FIG. 2, removed. After selected bars 53 are quickly repaired or replaced and installed on frame 52, frame 52 may then be moved upwardly in the direction of arrowed line C in FIGS. 4 and 5 from its open position in FIGS. 4 and 5 to its closed position in FIGS. 1-3, and then secured in place with nut-and-bolt assemblies 92, 94, and 98 so as to secure concave section 50 in the nested or closed position in preparation for the resumption of threshing in the normal manner.

In the embodiment denoted at 50, bars 53 extending between curved end members 70 and 72 and across curved intermediate members are single bars 53. As such, in concave section 50 frame 52 has parallel single bars 53. In an alternate embodiment of a concave section constructed and arranged in accordance with the principle of the invention, frame 52 can be formed with parallel rows of split bars. Such a concave section 130 is discussed in conjunction with FIGS. 9-12.

Concave section 130 is identical in every respect to concave section 50 in that it shares frame 51 and frame 52 and all associated nut-and-bolt assemblies. In this example, the bars, which are identical and are each denoted at 131, are each identical to bars 53 in that they share ends 112 and 113, upper threshing edge 115, lower end 116, and tongues 117. Bars 131 are each independently removably connected to frame 52 via the engagement assembly. Each engagement assembly for removably connecting each of the bars 53 to frame 52 includes elements thereof carried by each of the bars 53, namely, tongues 117, and complemental elements thereof carried by frame 52, namely, slots 105 in members 70, 72, 74, and 76. Again, the positioning of tongues 117 and slots 105 can be reversed.

Figure 9:
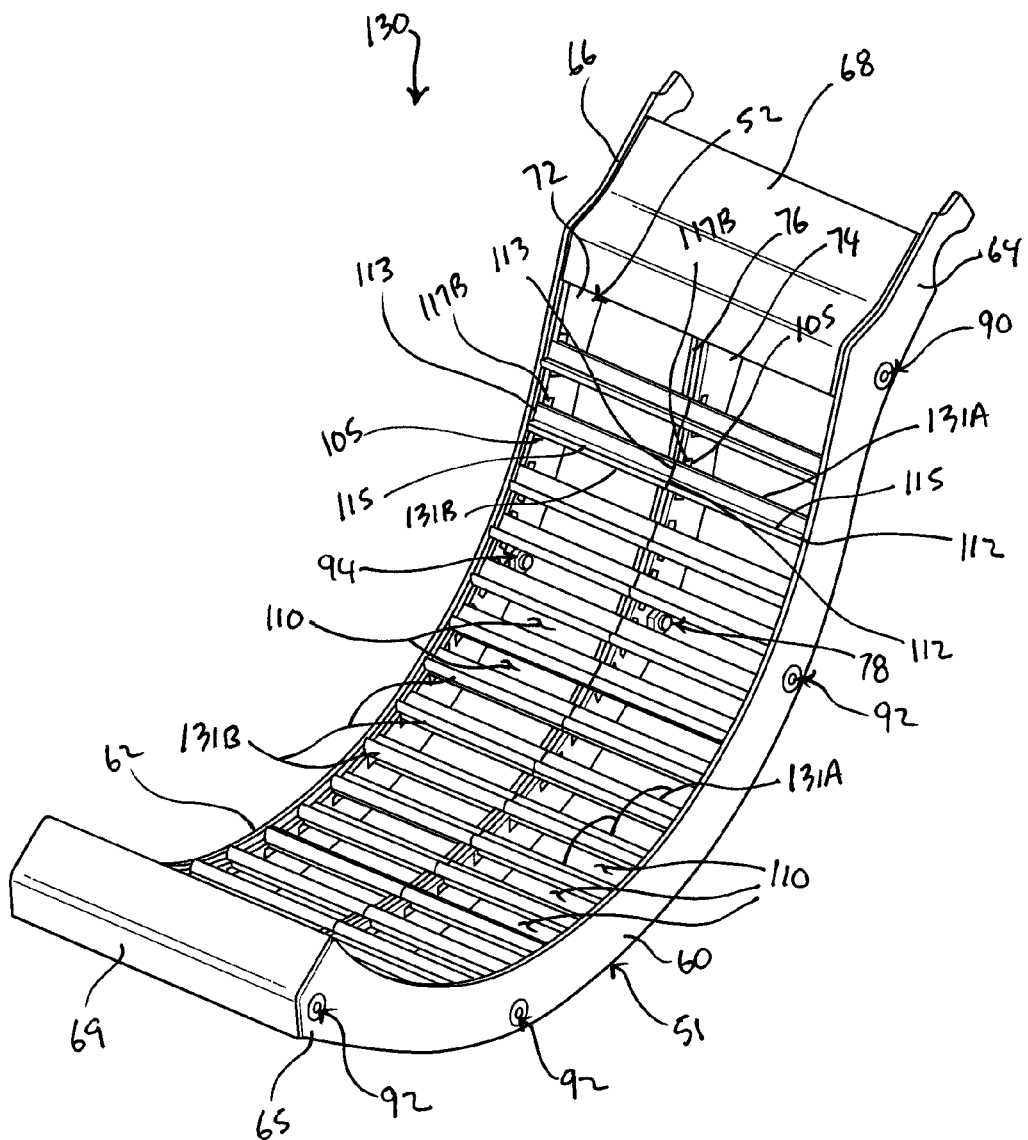
FIG. 9 is a perspective view of a concave section constructed and arranged in accordance with an alternate embodiment of the invention, the concave section includes parallel rows of bars carried by an inner frame connected to an outer frame.
Figure 10:
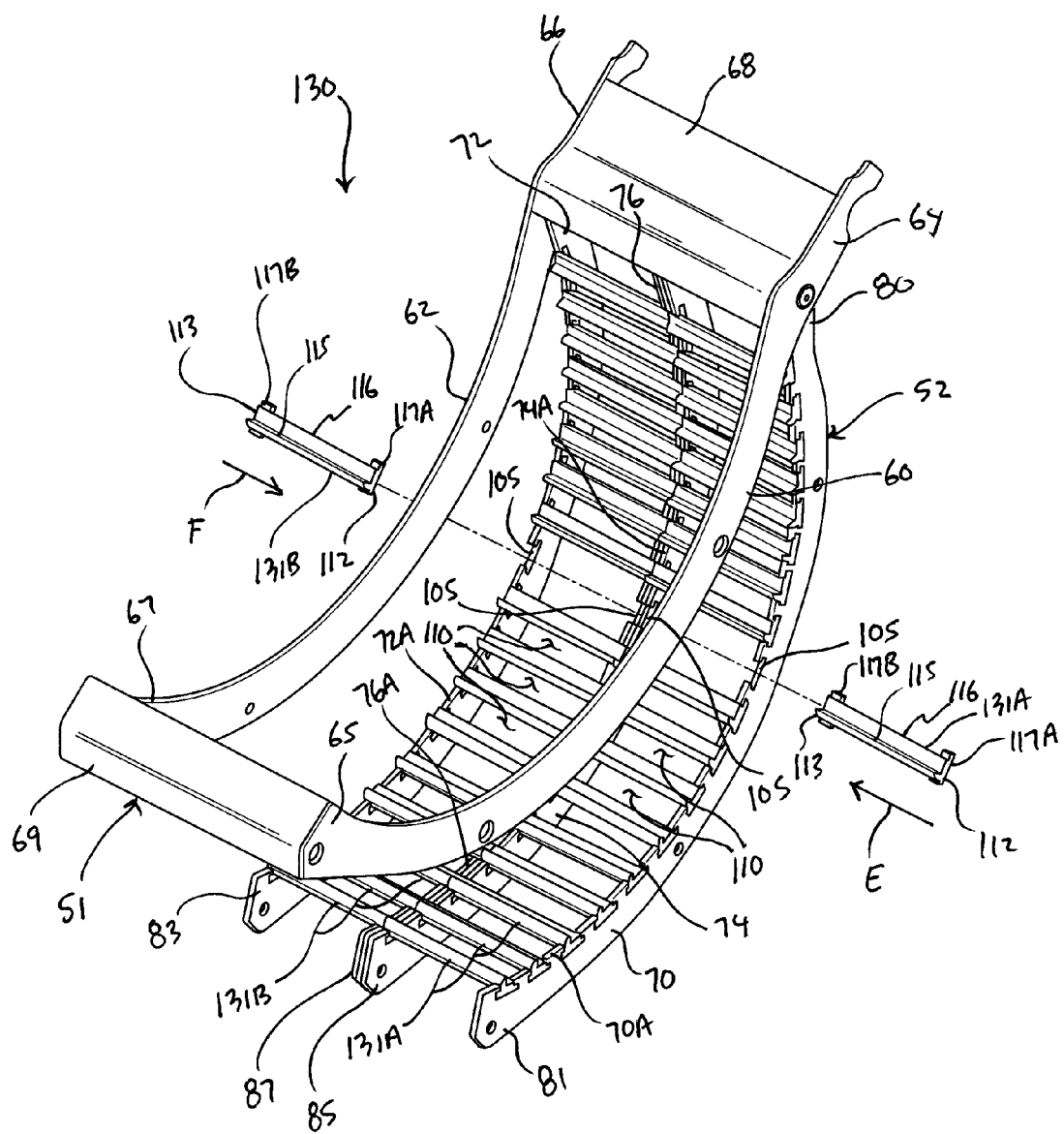
FIG. 10 is a perspective view of the embodiment of FIG. 9 shown as it would appear open with a pair of opposed bars removed from the inner frame of the concave section.

In concave section 130 bars 131 are half the length of bars 53 and include just two tongues 117, namely, tongue 117A near end 112 and tongue 117B near end 113. In this example, there are two axially aligned bars 131 for each row of bars 131, and rows of bars 131, of course, form openings 110 therebetween for grain to pass through as in concave section 50. Two bars 131 are axially aligned for each row. One bar 131A extends axially from member 70 to member 74, and the other bar 131B extends axially from member 76 to member 72. Specifically, one bar 131A extends axially from end 112 thereof at member 70 to end 113 thereof at member 74, and the corresponding tongues 117A and 117B are applied to axially aligned slots 105 in members 70 and 74 respectively. The other bar 131B extends axially from end 113 thereof at member 72 to end 112 thereof at member 76, and the corresponding tongues 117B and 117A are applied to axially aligned slots 105 in members 72 and 76 respectively. Each pair of bars 131A and 131B are axially aligned, and the end 113 of bar 131A extending between members 70 and 74 confronts and diametrically opposes the end 112 of bar 131B extending between members 72 and 76. FIG. 9 shows concave section 130 as it would appear closed with parallel rows of two bars 131A and 131B each. FIG. 10 shows concave section 130 as it would appear open to allow independent installation and removal of the various bars 131, and two corresponding bars 131A and 131B to make a row of two bars are shown detached from frame 52 in preparation for installation into the corresponding available set of axially aligned slots 105. To install these detached bars 131 into the axially aligned set of slots 105 in members 70, 72, 74, and 76, one bar 131A is positioned to axially align tongues 117A and 117B with axially aligned slots 105 in members 70 and 74, and bar 131A is then moved axially along its longitudinal axis in the direction of arrowed line E to set tongues 117A and 117B into slots 105 of the respective members 70 and 74. To detach bar 131A from frame 52, this operation need only be reversed. The other bar 131B is, in turn, positioned to axially align tongues 117A and 117B with axially aligned slots 105 in members 72 and 76, and bar 131B is then moved axially along its longitudinal axis in the direction of arrowed line F to set tongues 117A and 117B into slots 105 of the respective members 76 and 72. To detach bar 131B from frame 52, this operation need only be reversed. After bars 131A and 131B of each parallel row of bars 131A and 131B are so removably installed on frame 52, frames 51 and 52 may be adjusted via pivoting from the open position in FIG. 10 to the closed position in FIG. 9, and then secured with the corresponding nut-and-bolt fasteners in the closed position so as to ready concave section 130 for threshing.

Figure 11:
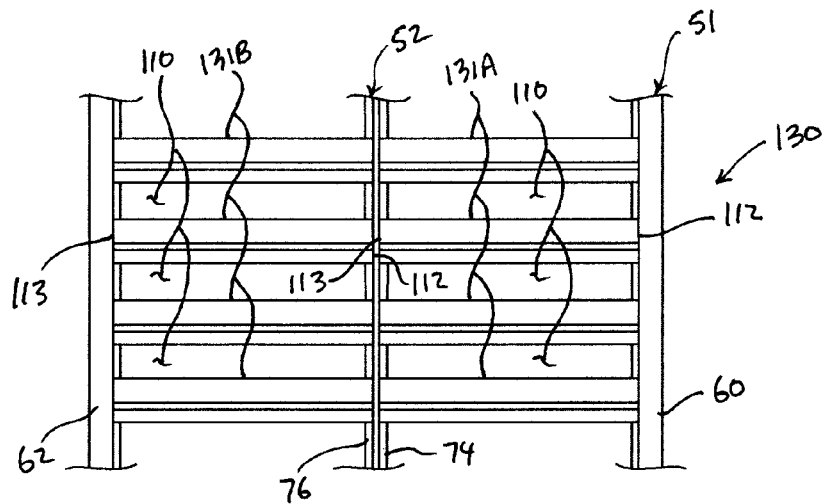
FIG. 11 is a top plan view of a section of the embodiment of FIG. 9 illustrating the outer frame capturing rows of bars carried by the inner frame.
Figure 12:
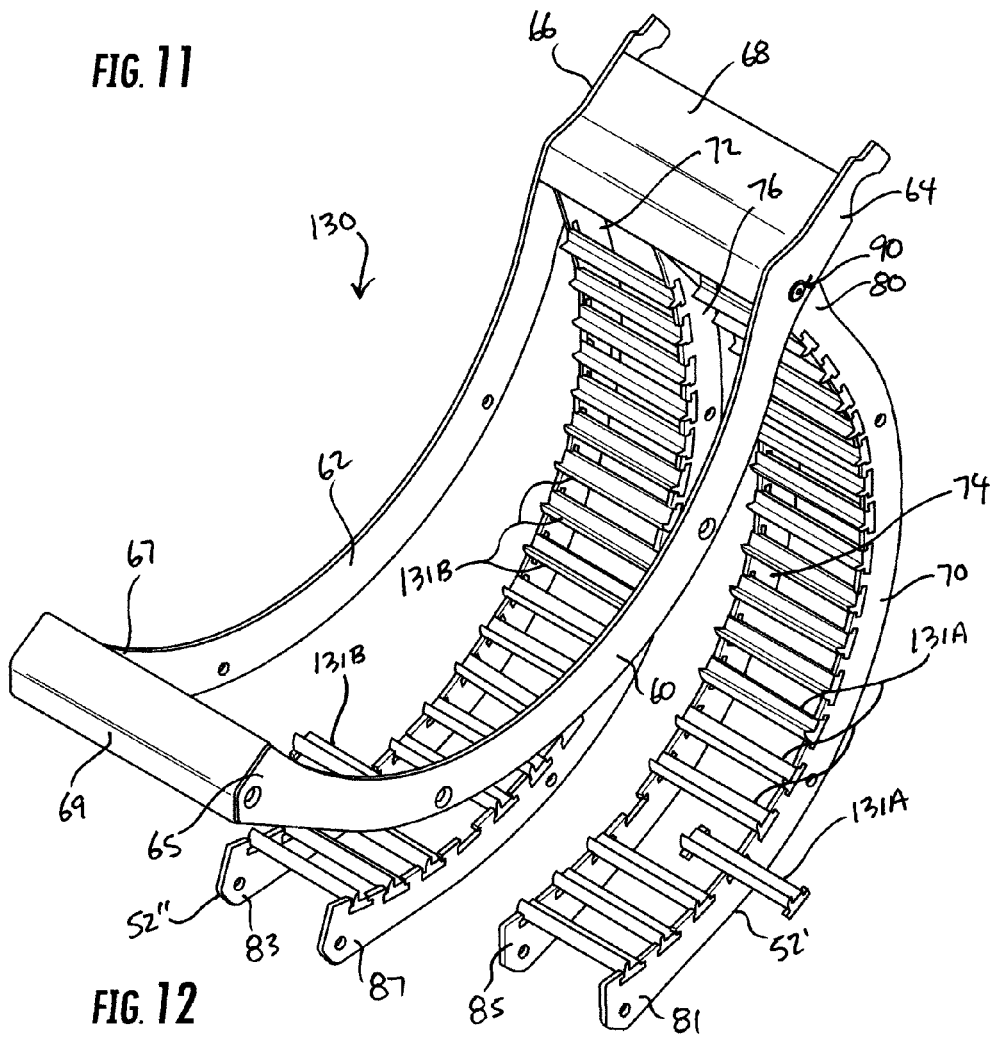
FIG. 12 is a perspective view of an alternate configuration of the embodiment of FIG. 10.

In the nested or closed position of frame 52 defining the closed position of concave section 130 in FIGS. 9 and 11, frame 51 restricts or otherwise restrains the rows of bars 131 from moving between installed and released positions. Specifically, in the nested or closed positions of frame 51, curved end member 60 of frame 51 that extends parallel to and is axially juxtaposed along the outer side of curved end member 70 of frame 52 closely confronts and makes direct contact against ends 112 of bars 131A extending between member 70 and member 74, and curved end member 62 of frame 51 that extends parallel to and is axially juxtaposed along the outer side of curved end member 72 of frame 52 closely confronts and makes direct contact against ends 113 of bars 131B extending between members 72 and 76, whereby curved end members 60 and 62 act as curved stops axially spaced from one another and juxtaposed on either side of the respective curved end members 70 and 72 of frame 52 and the respective ends 112 and 113 of the respective bars 131A and 131B capturing each row of bars 131A and 131B therebetween to restrict movement of bars 131 between their installed and released positions, and which also prevents the ability to install one or more bars 131 on frame 53 should one or more be inadvertently missing.

In concave section 130, members 70 and 72 are considered one frame or otherwise a sub-frame 52' of frame 52, and members 72 and 76 are considered another frame or sub-frame 52" of frame 52. Frames 52' and 52" cooperate to form frame 52 and are, of course, connected together for movement of frame 52 between the closed position of the open and closed positions as herein specifically described. Again, as discussed in conjunction with concave section 50, should bars 131 become worn or damaged so as to require replacement or repair, nut-and-bolt fasteners 92, 94, and 98, illustrated in FIG. 8, are simply removed to release frame 52 from frame 51, and frame 52 is pivotally moved downwardly to the open position as in FIG. 10. If desired, nut-and-bolt assemblies 78 in FIG. 2 connecting members 74 and 76 may be removed along with nut-and-bolt assembly 98 connecting ends 85 and 87 of members 74 and 76 to frame 51 to release frame 52' from frame 52" as in FIG. 12 to allow independent pivotal movement of frames 52' and 52" from open positions as in FIG. 12 to the closed positions as in FIG. 9, at which point the various nut-and-bolt assemblies 92, 94, 78, and 98, depicted in FIG. 2, may be re-installed to secure concave section 130 in the closed position in FIG. 9 in preparation for threshing. With this arrangement, nut-and-bolt assemblies 78, 92, and 98 may be removed to release frame 52' from frames 51 and 52" to allow independent pivotal movement of frame 52' from its closed position to its open position independently of frame 52" to allow a user to service bars 131 of frame 52', after which frame 52' may be pivoted back to its closed position and secured via nut-and-bolt assemblies 78, 92, and 98 to frames 52" and 51. Moreover, nut-and-bolt assemblies 78, 94, and 98 may be removed to release frame 52" from frames 51 and 52' to allow pivotal movement of frame 52" from its closed position to its open position independently of frame 52' to allow a user to service bars 131 of frame 52", after which frame 52" may be pivoted back to its closed position and secured via nut-and-bolt assemblies 78, 94, and 98 to frames 52' and 51.

Concave section 130 is exemplary of a "split-bar" construction. Another "split-bar" concave section 150 is shown in FIGS. 13-15.

Concave section 150 is identical in every respect to concave sections 50 and 130 in that it shares frame 51 and frame 52 and all associated nut-and-bolt assemblies. In this example, the bars, which are identical and are each denoted at 160, are half the length of bars 53 of concave section 50 like that of bars 131 of concave section 130. Referencing FIGS. 16-19, each bar 160 has a threshing component and a separating component. Each bar 160 is elongate and longitudinally straight and integrally formed via machining or molding and has opposed ends 162 and 163, an aggressive upper threshing edge 165 that extends between ends 162 and 163, a lower end 166 that extends between ends 162 and 163, a back 167 and an opposed front 168 that each extend between ends 162 and 163, a grate denoted generally at 170 formed in front 168, and a shoulder 180 formed in back 167. Upper threshing edge 165 is the threshing component of bar 160, and grate 170 is the separating component of bar 160. Grate 170 is formed in front 168 of bar 160 between upper threshing edge 165 and lower end 166, and extends along the length of bar 160 from end 162 to end 163. In this embodiment, grate 170 consists of identical and coextensive axially-aligned parallel fingers 171 that extend outwardly from front 168 to free ends 172. Fingers 171 are axially spaced forming openings 175 therebetween for grain to pass through. Fingers 171 are equally spaced apart and openings 175 are identically sized. Shoulder 180 is formed in back 167 of bar 160 between upper threshing edge 165 and lower end 166, and extends along the length of bar 160 from end 162 to end 163.

Just like bars 131 of concave section 130, bars 160 are each independently removably connected to frame 52 via the tongues 117 and slots 105 engagement assembly. Each engagement assembly for removably connecting each of the bars 160 to frame 52 includes the elements thereof in the form of tongues 117 carried by each of the bars 160 and the complemental elements thereof in the form of slots 105 carried by frame 52, specifically members 70, 72, 74, and 76. Like bars 131 of concave section 130, bars 160 each have two tongues 117, namely, tongue 117A near end 162 and tongue 117B near end 163.

Figure 13:
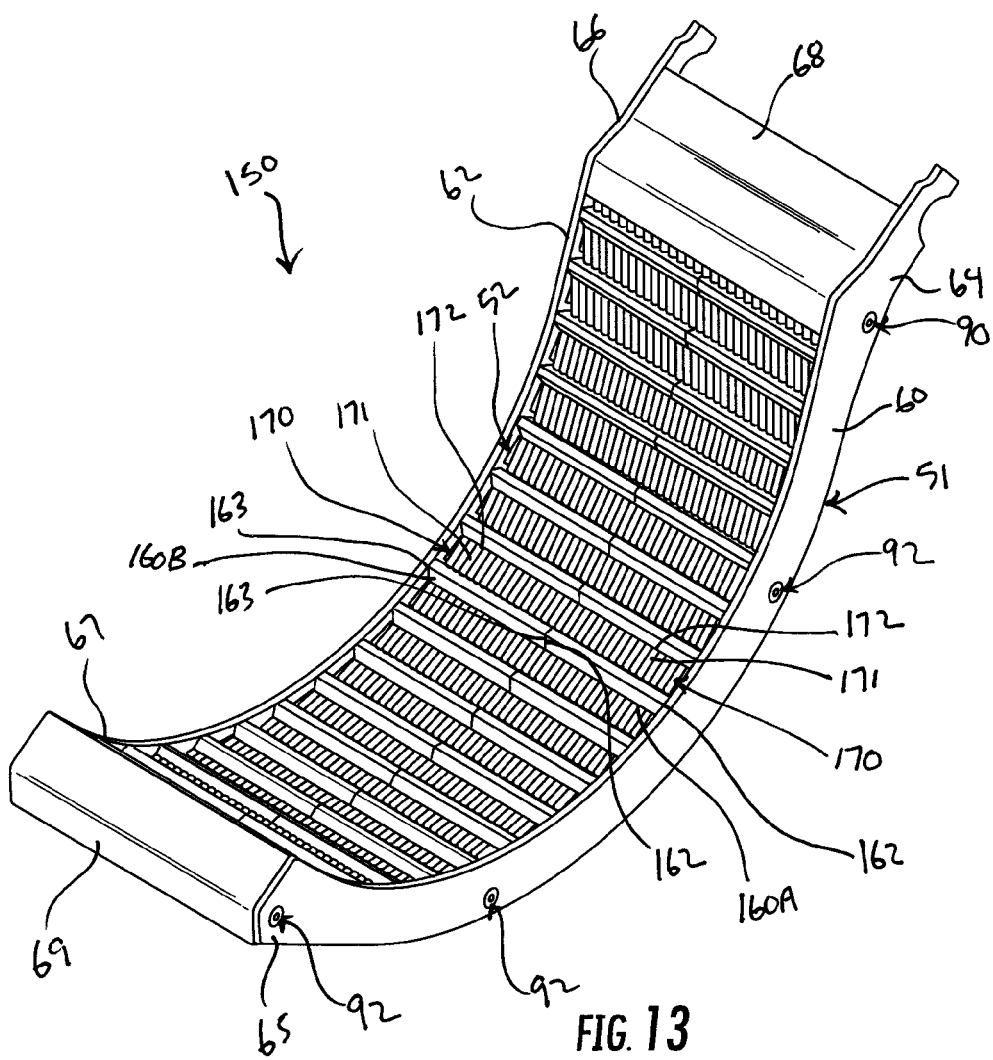
FIG. 13 is a perspective view of a concave section constructed and arranged in accordance with an alternate embodiment of the invention, the concave section includes parallel rows of bars carried by an inner frame connected to an outer frame, the bars each being formed with an integrated grate.
Figure 14:
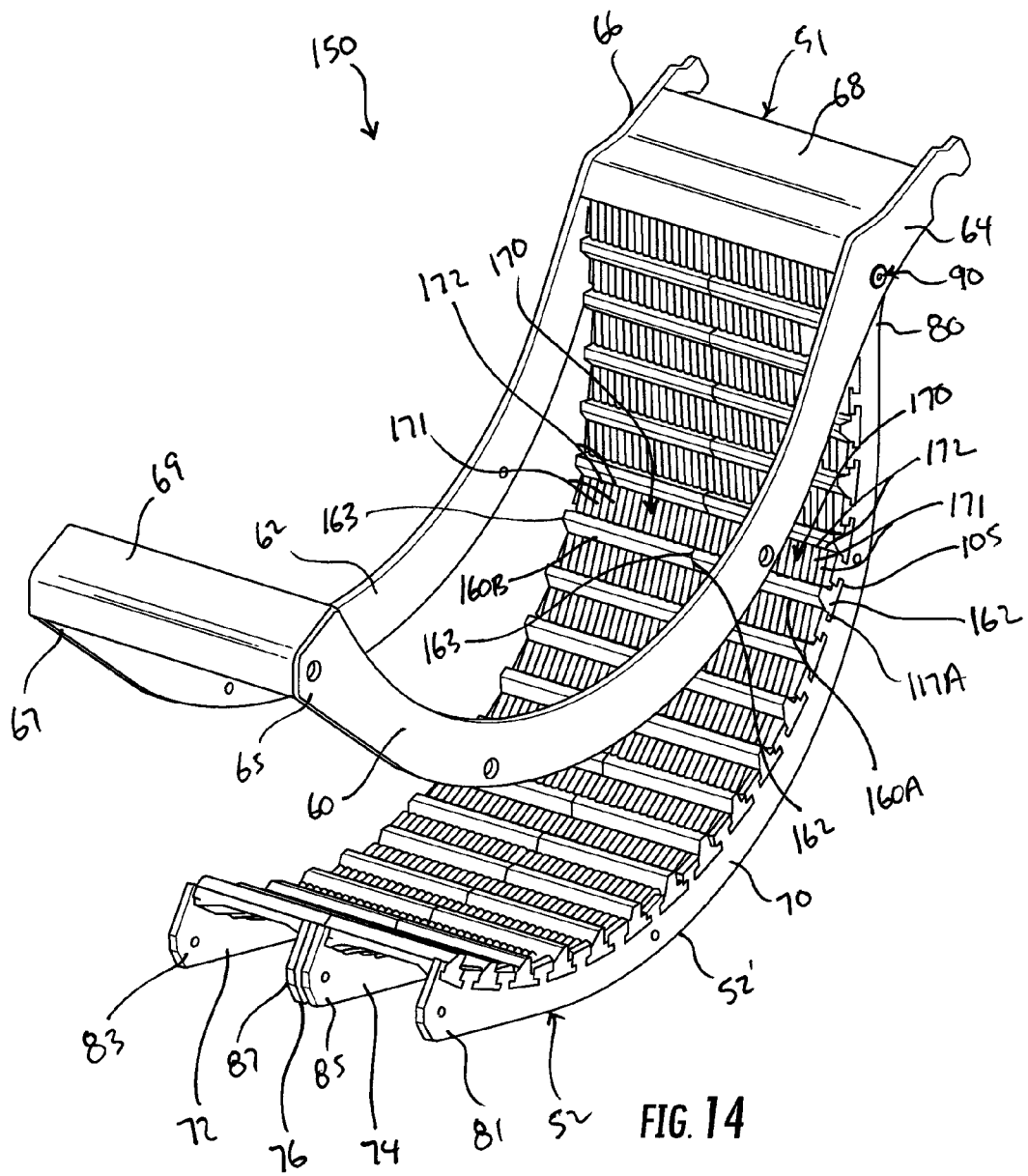
FIG. 14 is a perspective view of the embodiment of FIG. 13 shown as it would appear open.
Figure 15:
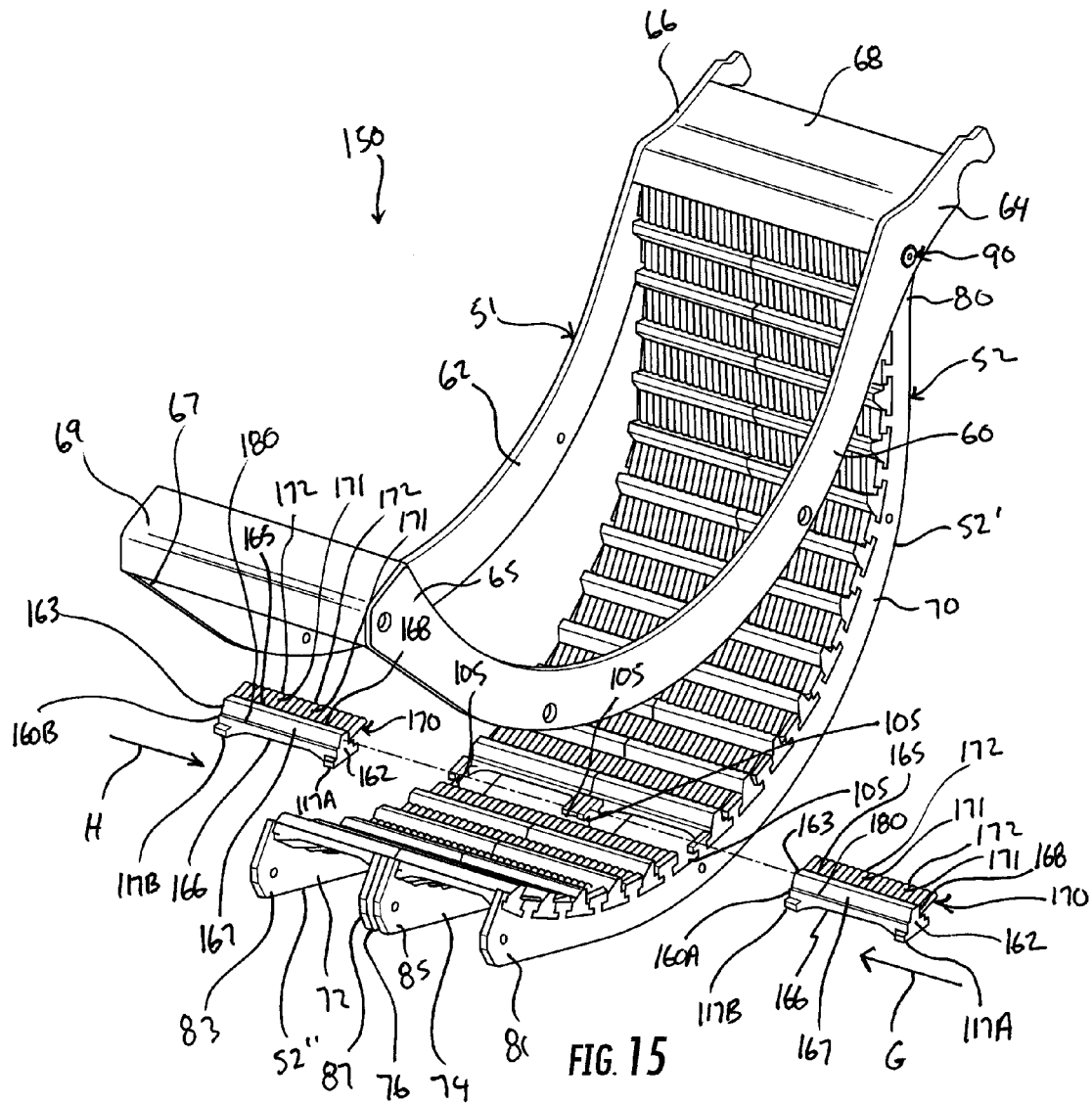
FIG. 15 is a view similar to that of FIG. 14 illustrating a pair of opposed bars removed from the inner frame of the concave section.
Figure 16:
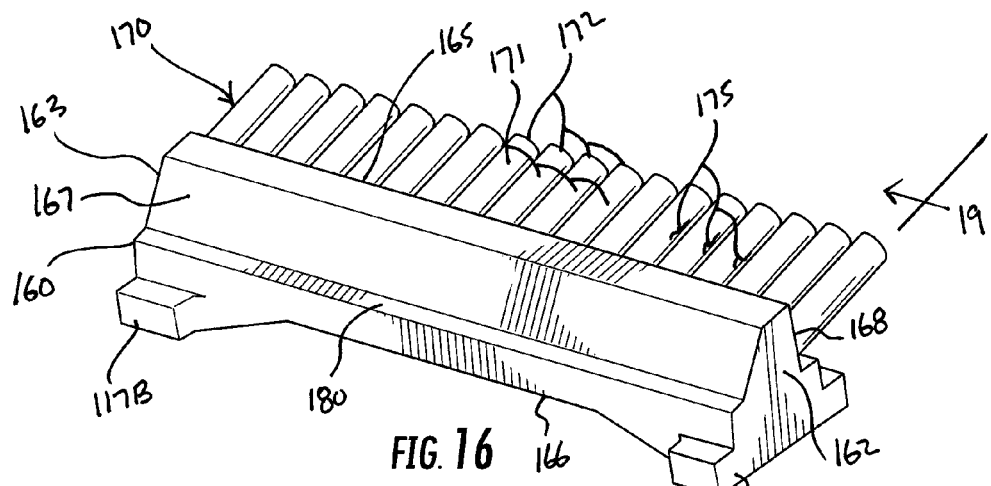
FIG. 16 is a rear perspective view of a bar of the concave section depicted in FIGS. 13-15.
Figure 17:
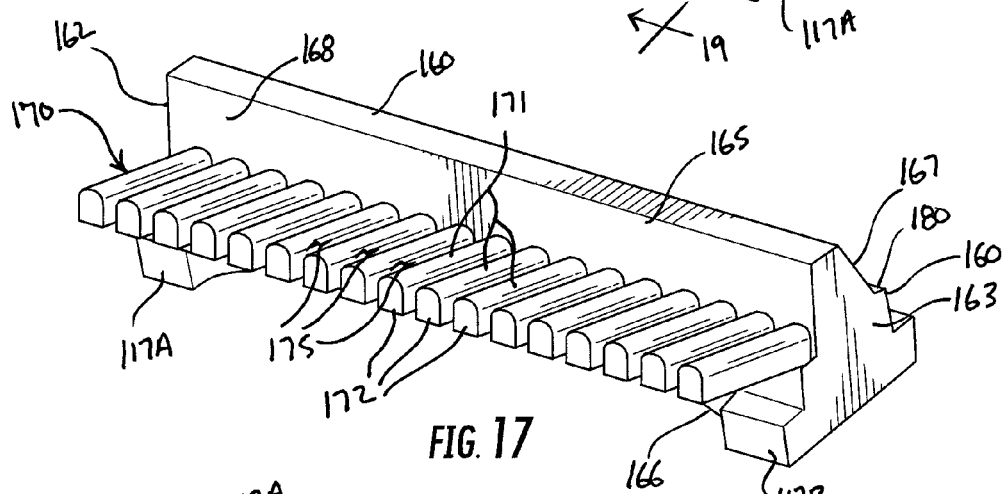
FIG. 17 is a front perspective view of the embodiment of FIG. 16.
Figure 18:
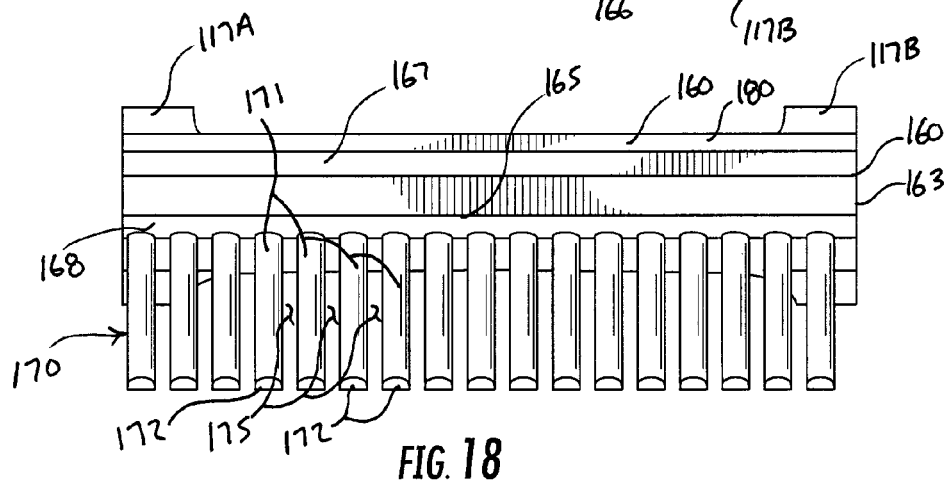
FIG. 18 is a top plan view of the embodiment of FIG. 16.
Figure 19:
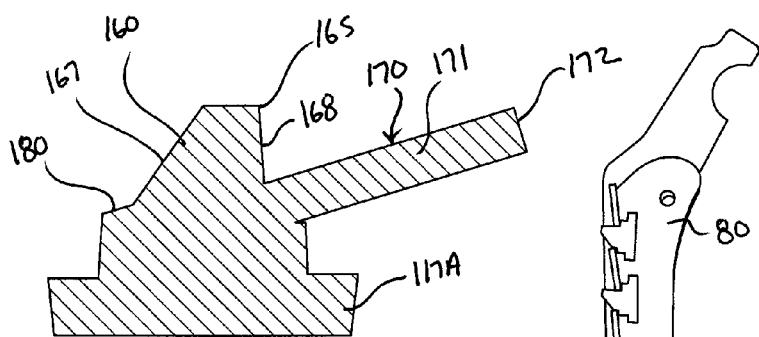
FIG. 19 is a section view taken along line 19-19 of FIG. 16.

In this example with reference to FIGS. 13-15, there are two axially aligned bars 160 for each row of bars 160, and rows of bars 160, of course, form openings 110 therebetween for grain to pass through as in concave sections 50 and 130. Two bars 160 are axially aligned for each row. One bar 160A extends axially from member 70 to member 74, and the other bar 160B extends axially from member 76 to member 72. Specifically, one bar 160A extends axially from end 162 thereof at member 70 to end 163 thereof at member 74, and the corresponding tongues 117A and 117B are applied to axially aligned slots 105 in members 70 and 74 respectively. The other bar 160B extends axially from end 162 thereof at member 72 to end 163 thereof at member 76, and the corresponding tongues 117B and 117A are applied to axially aligned slots 105 in members 72 and 76 respectively. Each pair of bars 160A and 160B are axially aligned, and the end 163 of bar 160A extending between members 70 and 74 confronts and diametrically opposes the end 162 of bar 160B extending between members 72 and 76. FIG. 13 shows concave section 130 as it would appear closed with parallel rows of two bars 160A and 160B each. FIG. 14 shows concave section 130 as it would appear open to allow independent installation and removal of the various bars 160. FIG. 15 is a view similar to that of FIG. 14 illustrating two corresponding bars 160A and 160B to make a row of two bars detached from frame 52 in preparation for installation. To install these detached bars 160 into the axially aligned set of slots 105 in members 70, 72, 74, and 76, one bar 160A is positioned to axially align tongues 117A and 117B with axially aligned slots 105 in members 70 and 74, and bar 160A is then moved axially along its longitudinal axis in the direction of arrowed line G to set tongues 117A and 117B into slots 105 of the respective members 70 and 74. To detach bar 160A from frame 52, this operation need only be reversed. The other bar 160B is, in turn, positioned to axially align tongues 117A and 117B with axially aligned slots 105 in members 76 and 72, and bar 160B is then moved axially along its longitudinal axis in the direction of arrowed line H to set tongues 117A and 117B into slots 105 of the respective members 76 and 72. To detach bar 160B from frame 52, this operation need only be reversed. After bars 160A and 160B of each parallel row of bars 160A and 160B are so removably installed on frame 52, frames 51 and 52 may be adjusted via pivoting from the open position in FIG. 14 to the closed position in FIG. 13, and then secured with the corresponding nut-and-bolt fasteners in the closed position so as to ready concave section 130 for threshing.

Figure 22:
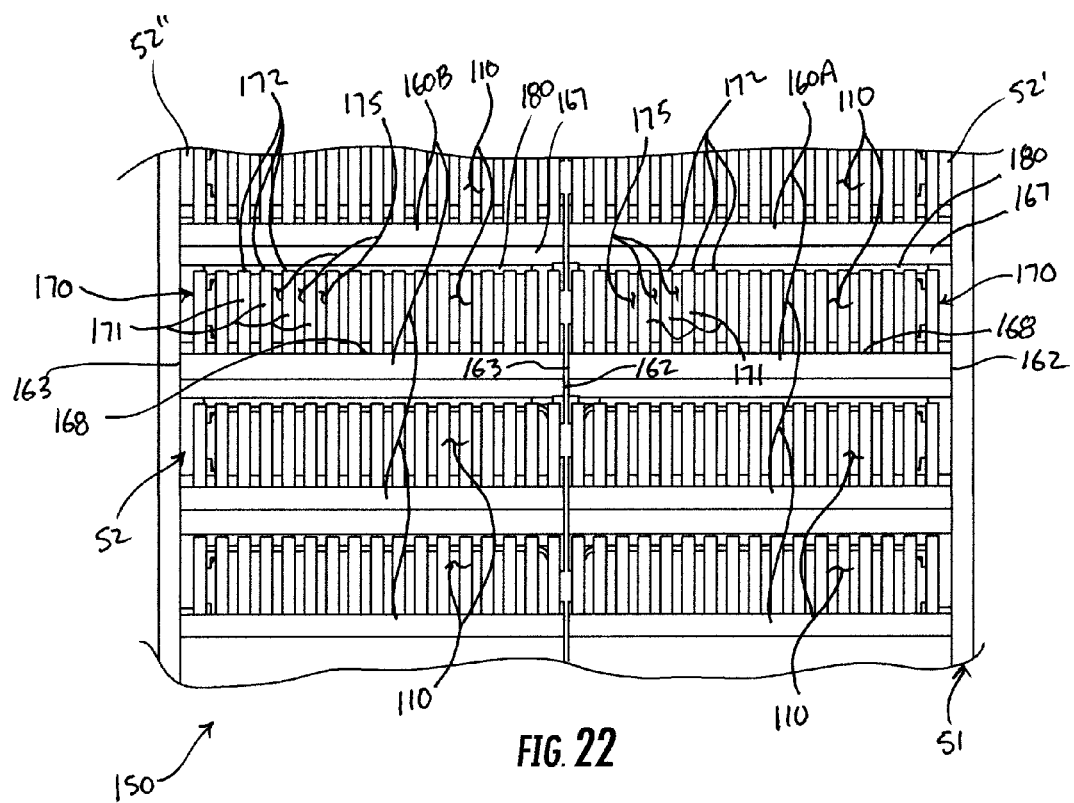
FIG. 22 is a top plan view of a section of the embodiment of FIG. 13 illustrating the outer frame capturing rows of bars carried by the inner frame.
Figure 23:
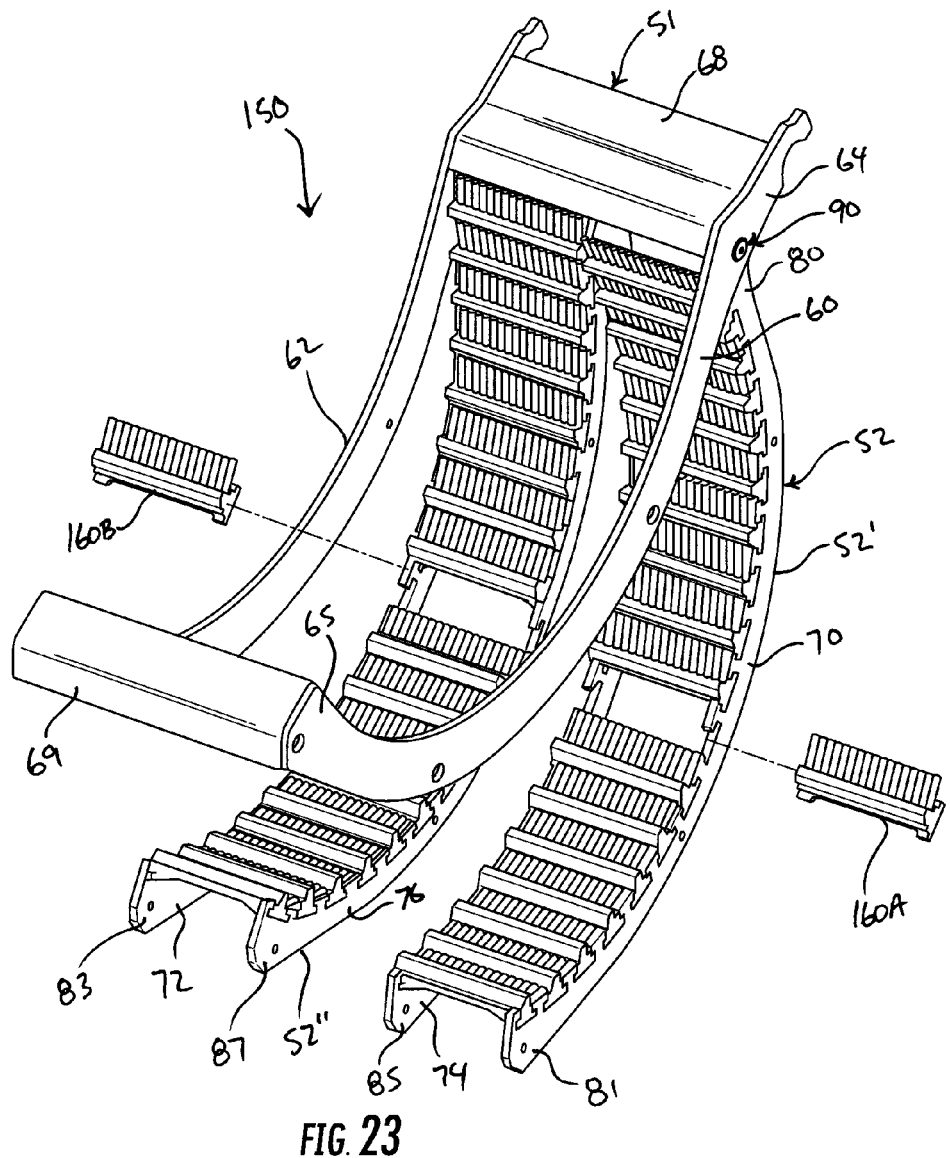
FIG. 23 is a perspective view of an alternate configuration of the embodiment of FIG. 14.

In the nested or closed position of frame 52 defining the closed position of concave section 150 in FIGS. 13 and 22, frame 51 restricts or otherwise restrains the rows of bars 160 from moving between installed and released positions. Specifically, in the nested or closed positions of frame 51, curved end member 60 of frame 51 that extends parallel to and is axially juxtaposed along the outer side of curved end member 70 of frame 52 closely confronts and makes direct contact against ends 162 of bars 160A extending between member 70 and member 74, and curved end member 62 of frame 51 that extends parallel to and is axially juxtaposed along the outer side of curved end member 72 of frame 52 closely confronts and makes direct contact against ends 163 of bars 160B extending between members 72 and 76, whereby curved end members 60 and 62 act as curved stops axially spaced from one another and juxtaposed on either side of the respective curved end members 70 and 72 of frame 52 and the respective ends 162 and 163 of the respective bars 160A and 160B capturing each row of bars 160A and 160B therebetween to restrict movement of bars 160 between their installed and released positions, and which also prevents the ability to install one or more bars 160 on frame 53 should one or more be inadvertently missing.

Figure 20:
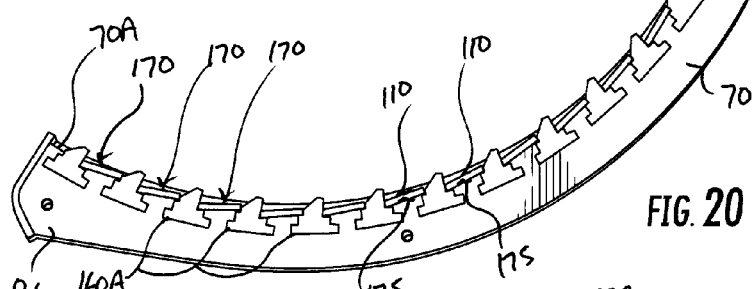
FIG. 20 is a side elevation view of the inner frame and the bars installed on the inner frame.
Figure 21:
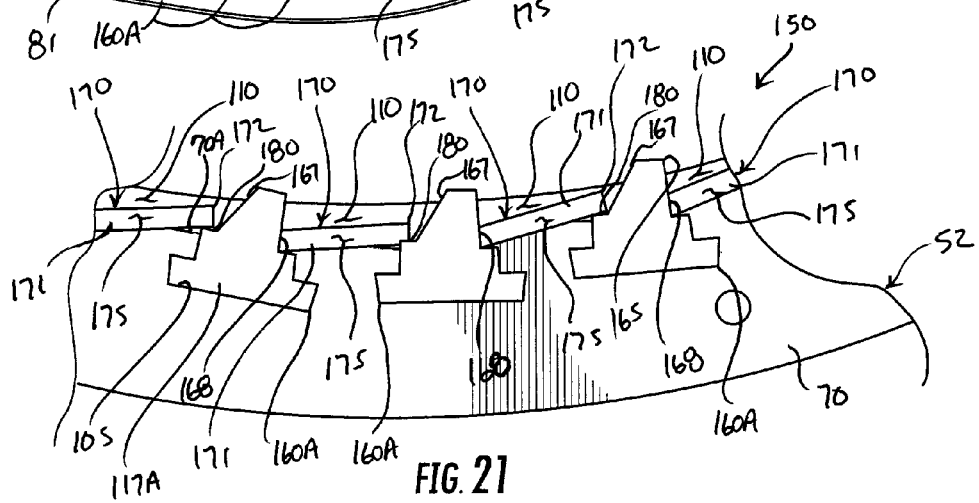
FIG. 21 is an enlarged fragmented view of a segment of the inner frame of FIG. 20 showing the interaction between bars installed on the inner frame.

In the installed position of the various bars 160 on frame 52 of concave assembly 150 in reference to FIGS. 20-22, the grate 170 of each bar 160 extends from front 168 across an adjacent opening 110 to back 167 of an adjacent bar 160 for separating grain at the corresponding opening 110 from threshed crop material. Specifically, the grate 170 of each bar 160 extends from front 168 thereof across an adjacent opening 110 to back 167 of an adjacent bar 160 and is in direct contact against the shoulder 180 of the adjacent bar 160. And so each grate 170 of one bar 160 extends across an adjacent opening 110 to the adjacent bar 160 where it rests against the shoulder 180 of the adjacent bar 160. More specifically, fingers 171 of each bar 160 are parallel relative to members 60, 62, 70, 72, 74, and 76 and extend across the adjacent opening 110 to free ends 172 at the adjacent bar 160, which are in direct contact so as to rest against the shoulder 180 of the adjacent bar 160. Grates 170 thus form a continuity at openings 110 between the bars 160 of adjacent rows of bars 160. Grain falls concurrently through openings 175 between fingers 171 and each corresponding opening 110 between adjacent rows of bars 160 for separating grain from threshed crop material. Openings 175 of each grate 170 reduce the corresponding opening 110 size for smaller grains. In the rotary processing unit, bars 160 extend parallel to the axis of rotation of the rotating threshing drum, and fingers 171 of the grate 170 of each bar 160 extend transverse to the axis of rotation of the rotating threshing drum, upper threshing edges 165 extend upward from top edges 70A, 70B, 70C, and 70D of members 70, 72, 74, and 76 of frame 52 to provide aggressive threshing of the harvested crop and grate openings 175 and openings 110 between bars 160 are for grain to pass through and for separating grain from threshed crop material. Should any bars 160 become worn or damaged so as to require replacement or repair, or should the fingers 171 of the separating grate 170 of any bars become worn or damaged so as to require replacement or repair, frame 52 may be adjusted from its closed position in FIG. 13 to its open position in FIGS. 14 and 15 to allow any of the bars 160 needing replacement or repair to be easily removed, repaired or replaced, and reinstalled, in accordance with the principle of the invention.

In concave section 150 as in concave section 130, members 70 and 72 are considered one frame or otherwise a sub-frame 52' of frame 52, and members 72 and 76 are considered another frame or sub-frame 52" of frame 52. Frames 52' and 52" are, of course, connected together for movement of frame 52 between the closed position of the frame assembly the open position of the frame assembly as herein specifically described. Again, as discussed in conjunction with concave section 130, should bars 160 become worn or damaged so as to require replacement or repair, nut-and-bolt fasteners 92, 94, and 98, as illustrated in FIG. 8, are simply removed, and frame 52 is pivotally moved downwardly to the open position as in FIGS. 14 and 15. If desired, nut-and-bolt assemblies 78 in FIG. 2 connecting members 74 and 76 may be removed along with nut-and-bolt assembly 98 connecting ends 85 and 87 of members 74 and 76 to frame 51 to release frame 52' from frame 52" as in FIG. 12 to allow independent pivotal movement of frames 52' and 52" from open positions as in FIG. 22 to the closed positions as in FIG. 13, at which point the various nut-and-bolt assemblies 92, 94, 78, and 98, depicted in FIG. 2, may be re-installed to secure concave section 150 in the closed position in FIG. 13 in preparation for threshing. With this arrangement, nut-and-bolt assemblies 78, 92, and 98 may be removed to release frame 52' from frames 51 and 52" to allow pivotal movement of frame 52' from its closed position to its open position independently of frame 52" to allow a user to service bars 160 of frame 52', after which frame 52' may be pivoted back to its closed position and secured via nut-and-bolt assemblies 78, 92, and 98 to frames 52" and 51. Moreover, nut-and-bolt assemblies 78, 94, and 98 may be removed to release frame 52" from frames 51 and 52' to allow independent pivotal movement of frame 52" from its closed position to its open position independently of frame 52' to allow a user to service bars 160 of frame 52", after which frame 52" may be pivoted back to its closed position and secured via nut-and-bolt assemblies 78, 94, and 98 to frames 52' and 51.

The grate 170 of each bar 160 of concave section 150 includes eighteen axially spaced parallel fingers. Bars having similar constructions with different grate configurations can be used without departing from the invention. As matter of example, FIG. 24 is a perspective view a bar 190 formed with a grate constructed and arranged in accordance with an alternate embodiment of the invention, FIG. 25 is a top plan view of the embodiment of FIG. 24, and FIG. 26 is a side elevation view of the embodiment of FIG. 24, the opposite side elevation view being the same thereof. Like bars 160, bar 190 shares ends 162 and 163, upper threshing edge 165, lower end 166, back 167, front 168, grate 170 formed of axially aligned parallel fingers 171, tongues 117A and 117B, and shoulder 180. In bar 190, grate 170 includes nine axially spaced parallel fingers 171, which are different in cross-section, which are somewhat larger than fingers 171 of bars 160, and which are spaced further apart such that openings 175 of bar 190 are larger than openings 175 of bars 160 for relating to larger grains.

In another example, FIG. 27 is a perspective view a bar 200 formed with a grate constructed and arranged in accordance with an alternate embodiment of the invention, FIG. 28 is a top plan view of the embodiment of FIG. 27, and FIG. 29 is a side elevation view of the embodiment of FIG. 27, the opposite side elevation view being the same thereof. Like bars 160 and 190, bar 200 shares ends 162 and 163, upper threshing edge 165, lower end 166, back 167, front 168, grate 170 formed of axially aligned parallel fingers 171, tongues 117A and 117B, and shoulder 180. In bar 200, grate 170 includes six axially spaced parallel fingers 171, which are generally the same in cross section as in bar 190, which are somewhat larger than fingers 171 of bars 160 and 190, and which are spaced further apart such that openings 175 of bar 200 are larger than openings 175 of bars 160 and 190 for relating to even larger grains.

The invention has been described above with reference to preferred embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A concave for an agricultural combine, comprising:
   a frame assembly, the frame assembly includes a first frame connected to a second frame for movement between an open position and a closed position relative to the second frame;
   the first frame includes curved members axially spaced from one another;
   threshing bars;
   an engagement assembly non-destructively connects each of the threshing bars to the curved members of the first frame, the threshing bars are spaced from one another and extend axially between the curved members forming openings therebetween for grain to pass through;
   the threshing bars are non-destructively connected to the first frame via the engagement assemblies, when the first frame is in the open position relative to the second frame and when the first frame is in the closed position relative to the second frame;
   the engagement assemblies allow independent non-destructive removal of the threshing bars relative to one another from the first frame, when the first frame is in the open position relative to the second frame; and
   the second frame restrains independent non-destructive removal of the threshing bars relative to one another from the first frame via the engagement assemblies, when the first frame is in the closed position relative to the second frame.

2. The concave according to claim 1, wherein the first frame is pivotally connected to the second frame for movement between the open position and the closed position relative to the second frame.

3. The concave according to claim 2, wherein the second frame includes curved stops axially spaced from one another, the curved stops are juxtaposed on either side of the respective curved members and restrain the threshing bars from being independently non-destructively removed from the first frame via the engagement assemblies, when the first frame is in the closed position relative to the second frame.

4. The concave according to claim 1, wherein each said engagement assembly includes engagement elements carried by each of the threshing bars and corresponding complemental engagement elements carried by the first frame.

5. The concave according to claim 4, wherein the engagement assemblies prevent axial rotation of the respective threshing bars relative to the first frame.

6. The concave according to claim 4, wherein each of the engagement elements is one of a tongue and a slot, and each of the complemental engagement elements is the other one of the tongue and the slot.

7. A concave for an agricultural combine, comprising:
a frame assembly, the frame assembly includes a first frame connected to a second frame for movement between an open position and a closed position relative to the second frame;
the first frame includes curved members axially spaced from one another;
threshing bars, the threshing bars each include a separating grate;
an engagement assembly non-destructively connects each of the threshing bars to the curved members of the first frame, the threshing bars are spaced from one another and extend axially between the curved members forming openings therebetween for grain to pass through, and the separating grate of each one of the threshing bar extends across an adjacent one of the openings for separating grain from threshed crop material;
the threshing bars are non-destructively connected to the first frame via the engagement assemblies, when the first frame is in the open position relative to the second frame and when the first frame is in the closed position relative to the second frame;
the engagement assemblies allow independent non-destructive removal of the threshing bars from the first frame, when the first frame is in the open position relative to the second frame; and
the second frame restrains independent non-destructive removal of the threshing bars relative to one another from the first frame via the engagement assemblies, when the first frame is in the closed position relative to the second frame.

8. The concave according to claim 7, wherein the separating grate of each threshing bar comprises parallel fingers axially spaced from one another.

9. The concave according to claim 7, wherein the first frame is pivotally connected to the second frame for movement between the open and the closed position relative to the second frame.

10. The concave according to claim 9, wherein the second frame includes curved stops axially spaced from one another, the curved stops are juxtaposed on either side of the respective curved members and restrain the threshing bars from being independently non-destructively removed from the first frame via the engagement assemblies, when the first frame is in the closed position relative to the second frame.

11. The concave according to claim 7, wherein each said engagement assembly includes engagement elements carried by each of the threshing bars and corresponding complemental engagement elements carried by the first frame.

12. The concave according to claim 11, wherein the engagement assemblies prevent axial rotation of the respective threshing bars relative to the first frame.

13. The concave according to claim 12, wherein each of the engagement elements is one of a tongue and a slot, and each of the complemental engagement elements is the other one of the tongue and the slot.

14. A concave for an agricultural combine, comprising:
a first frame includes curved members axially spaced from one another;
threshing bars;
an engagement assembly non-destructively connects each of the threshing bars to the curved members of the first frame, the threshing bars are spaced from one another and extend axially between the curved members forming openings therebetween for grain to pass through;
a second frame;
the engagement assemblies allow independent non-destructive removal of the threshing bars relative to one another from the first frame, when the second frame is spaced apart from the first frame; and
the second frame restrains independent non-destructive removal of the threshing bars relative to one another from the first frame via the engagement assemblies, when the second frame is juxtaposed relative to the first frame;
wherein the threshing bars are non-destructively connected to the first frame via the engagement assemblies, when the second frame is spaced apart from the first frame and when the second frame is juxtaposed relative to the first frame.

15. The concave according to claim 14, wherein the second frame includes curved stops axially spaced from one another, the curved stops are juxtaposed on either side of the respective curved members and interact with the threshing bars restraining the threshing bars from being independently non-destructively removed relative to one another from the first frame, when the second frame is juxtaposed relative to the first frame.

16. The concave according to claim 14, wherein each said engagement assembly includes engagement elements carried by each of the threshing bars and corresponding complemental engagement elements carried by the first frame.

17. The concave according to claim 16, wherein the engagement assemblies prevent axial rotation of the respective threshing bars relative to the first frame.

18. The concave according to claim 16, wherein each of the engagement elements is one of a tongue and a slot, and each of the complemental engagement elements is the other one of the tongue and the slot.

* * * * *